(12) United States Patent  (10) Patent No.: US 8,549,431 B2
Yabu et al.  (45) Date of Patent: Oct. 1, 2013

(54) CONTENT DISPLAY DEVICE AND CONTENT DISPLAY METHOD

(75) Inventors: Hiroshi Yabu, Osaka (JP); Ryouichi Kawanishi, Kyoto (JP); Tsutomu Uenoyama, Osaka (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 13/054,628

(22) PCT Filed: May 18, 2010

(86) PCT No.: PCT/JP2010/003345
§ 371 (c)(1),
(2), (4) Date: Jan. 18, 2011

(87) PCT Pub. No.: WO2010/134324
PCT Pub. Date: Nov. 25, 2010

(65) Prior Publication Data
US 2011/0167384 A1  Jul. 7, 2011

(30) Foreign Application Priority Data
May 19, 2009  (JP) .................................. 2009-120695

(51) Int. Cl.
*G06F 3/048* (2013.01)
*G06F 3/041* (2006.01)
*G06F 17/30* (2006.01)

(52) U.S. Cl.
USPC ............................ 715/810; 345/173; 455/566

(58) Field of Classification Search
USPC ........................... 715/810; 345/173; 455/566
See application file for complete search history.

(56) References Cited

U.S. PATENT DOCUMENTS

| | | | |
|---|---|---|---|
| 6,707,449 B2 * | 3/2004 | Hinckley et al. ............... | 345/173 |
| 7,822,443 B2 * | 10/2010 | Kim et al. ...................... | 455/566 |
| 8,305,356 B1 * | 11/2012 | Jang ................................ | 345/173 |
| 2003/0009493 A1 | 1/2003 | Parker et al. | |
| 2004/0125081 A1 * | 7/2004 | Hayakawa ...................... | 345/156 |
| 2004/0164954 A1 | 8/2004 | Rekimoto | |
| 2006/0036960 A1 | 2/2006 | Loui | |
| 2006/0090141 A1 | 4/2006 | Loui et al. | |
| 2007/0058210 A1 | 3/2007 | Sakuramata et al. | |
| 2007/0080953 A1 * | 4/2007 | Lii ................................. | 345/173 |

(Continued)

FOREIGN PATENT DOCUMENTS

| | | |
|---|---|---|
| JP | 2000-163193 | 6/2000 |
| JP | 2004-038603 | 2/2004 |

(Continued)

*Primary Examiner* — Jordany Nunez
(74) *Attorney, Agent, or Firm* — Wenderoth, Lind & Ponack, L.L.P.

(57) ABSTRACT

The invention aims to provide a user interface for efficiently displaying desired content from among a large number of contents.

An operation location and an operation amount of an operation that has been made on an operation member is detected. Based on the operation location, one content is selected from among a plurality of contents that have been arranged in sequence, and a display unit displays the selected one content. The display unit displays another content when the operation location has moved during the display of the selected one content, an order of said another content being different from an order of the selected one content by a number based on the operation amount detected by a detection unit.

10 Claims, 24 Drawing Sheets

Selection range: 50

Selection range: 5

(56) References Cited

U.S. PATENT DOCUMENTS

| | | | |
|---|---|---|---|
| 2008/0068469 A1 | 3/2008 | Takagi et al. | |
| 2008/0094367 A1* | 4/2008 | Van De Ven et al. | 345/173 |
| 2008/0297482 A1* | 12/2008 | Weiss | 345/173 |
| 2010/0085317 A1* | 4/2010 | Park et al. | 345/173 |
| 2010/0138763 A1* | 6/2010 | Kim | 715/765 |
| 2010/0291973 A1* | 11/2010 | Nakahara et al. | 455/566 |
| 2013/0127765 A1* | 5/2013 | Behdasht et al. | 345/173 |

FOREIGN PATENT DOCUMENTS

| | | |
|---|---|---|
| JP | 2004-252836 | 9/2004 |
| JP | 2004-288208 | 10/2004 |
| JP | 2007-065762 | 3/2007 |
| JP | 2007-110677 | 4/2007 |
| JP | 2008-071168 | 3/2008 |
| JP | 2008-257374 | 10/2008 |
| JP | 2009-508224 | 2/2009 |
| JP | 2 133 776 | 12/2009 |

* cited by examiner

| Order | Image |
|---|---|
| 0 |  |
| 1 |  |
| 2 |  |
| ⋮ | ⋮ |
| 19999 |  |

Unselected state

Selected state

Selection range: 50

Selection range: 5

FIG. 7

| Pressure level | Selection range |
|---|---|
| 1 | 1000 |
| 2 | 500 |
| 3 | 200 |
| 4 | 100 |
| 5 | 50 |
| 6 | 20 |
| 7 | 10 |
| 8 | 5 |
| 9 | 2 |
| 10 | 1 |

Pre-move

Selected order: 296

Selection range: 50

Post-move

Selected order:
296+50=346

| Order | Image | Group |
|---|---|---|
| 0 |  | Driving |
| 1 |  | Driving |
| ⋮ | ⋮ | ⋮ |
| 16968 |  | Climbing |
| ⋮ | ⋮ | ⋮ |
| 19999 |  | Shrine visit |

FIG. 17

| Order | Image | Group |
|---|---|---|
| 0 | | Driving |
| 1 | | Driving |
| ⋮ | ⋮ | ⋮ |
| 16968 | | Climbing |
| ⋮ | ⋮ | ⋮ |
| 19999 | | Shrine visit |

⇒

The group "Climbing" is selected

| Order | Image |
|---|---|
| 0 | |
| 1 | |
| ⋮ | ⋮ |
| 699 | |

Seven hundred images are selected

Unselected state

Selected state

Unselected state

Selected state

CONTENT DISPLAY DEVICE AND CONTENT DISPLAY METHOD

TECHNICAL FIELD

The present invention relates to technology for displaying contents such as pages and images of an electronic book, and in particular to a user interface that enables a user to select and display desired content from among a large number of contents.

BACKGROUND ART

There is a known image processing device that has a user interface for enabling display of a desired page included in an image constituted from a plurality of images (see Patent Literature 1).

In this image processing device, each of the pages constituted by the image is considered as one unit. Upon performing a touch operation on the image that is displayed on a touchscreen to show the entire page structure, one of the pages that is at a location of the touch can be quickly opened. Also, touching a predetermined location on the page that has been opened allows flipping over the pages one by one to reach and display the desired page.

In other words, once a certain page that is in the vicinity of the desired page has been opened by designating a rough location, the pages can be flipped over one by one starting from that certain page to reach and display the desired page.

CITATION LIST

Patent Literature

[Patent Literature 1]
JP Patent Application Publication No. 2007-110677

SUMMARY OF INVENTION

Technical Problem

When the number of pages is extremely large such as several thousands and tens of thousands, the above-described conventional technology renders the width of each page displayed on the touchscreen very small, because the size of the touchscreen is limited. Then, a slight change in the designated location will lead to a large fluctuation in the page to be displayed.

Consequently, it becomes more frequent that designating a rough location by a touch operation results in display of a page that is distant from the desired page. In this case, the user has to reach the desired page by flipping over the pages one by one starting from that page distant from the desired page.

This gives rise to the problem that it takes a long time to select and display the desired page from among a large number of pages.

The present invention has been conceived in light of the above problem. It is an object of the present invention to provide a content display device having a user interface that, when there are a large number of display targets that can be displayed (e.g., for example, each page and each image of an electronic book), enables quick selection and display of a desired display target from among the display targets. It is also an object of the present invention to provide a content display method for achieving such a user interface.

Solution to Problem

A content display device pertaining to the present invention comprises: a detection unit operable to detect an operation location and an operation amount of an operation that has been made on an operation member; a display unit; a display control unit operable to (i) based on the operation location, select one content from among a plurality of contents that have been arranged in sequence, and (ii) cause the display unit to display the selected one content; and a display update unit operable to cause the display unit to display another content when the operation location has moved during the display of the selected one content, an order of said another content being different from an order of the selected one content by a number based on the operation amount detected by the detection unit.

Advantageous Effects of Invention

The content display device having the above structure can designate a rough order by designating a location within an entirety of the plurality of contents. The order of content to be displayed can be changed by moving the operation location from the designated order to the order of desired content.

At this time, the amount by which the order of content to be displayed is changed at once can be adjusted by the amount of operation performed at the operation location (e.g., pressure). Hence, in a case where the designated order is distant from the order of the desired content, the amount of operation can be adjusted to make a large change in the order of content to be displayed. This way, the designated order can be quickly changed to the vicinity of the order of the desired content. In a case where the designated order is in the vicinity of the order of the desired content, the amount of operation can be adjusted to make a small change in the order of content to be displayed. This way, the desired content can be selected and displayed with high accuracy.

Therefore, even when there are a large number of contents, the desired content can be selected and displayed quickly.

BRIEF DESCRIPTION OF DRAWINGS

FIG. 7 is a correspondence table showing a correspondence between a pressure level and a selection range.

FIG. 15 shows a functional structure of the image display device 100a.

FIG. 17 shows extraction of images that belong to a selected group.

FIG. 18 is a flowchart showing processing performed by the image display device 100a.

DESCRIPTION OF EMBODIMENTS

1. Embodiment 1

The following describes, as a content display device pertaining to Embodiment 1 of the present invention, an image display device for selecting and displaying a desired image from among a large number of images that have been recorded in order from the oldest to the newest image capturing date/time.

1-1. Structure

Figure 1:
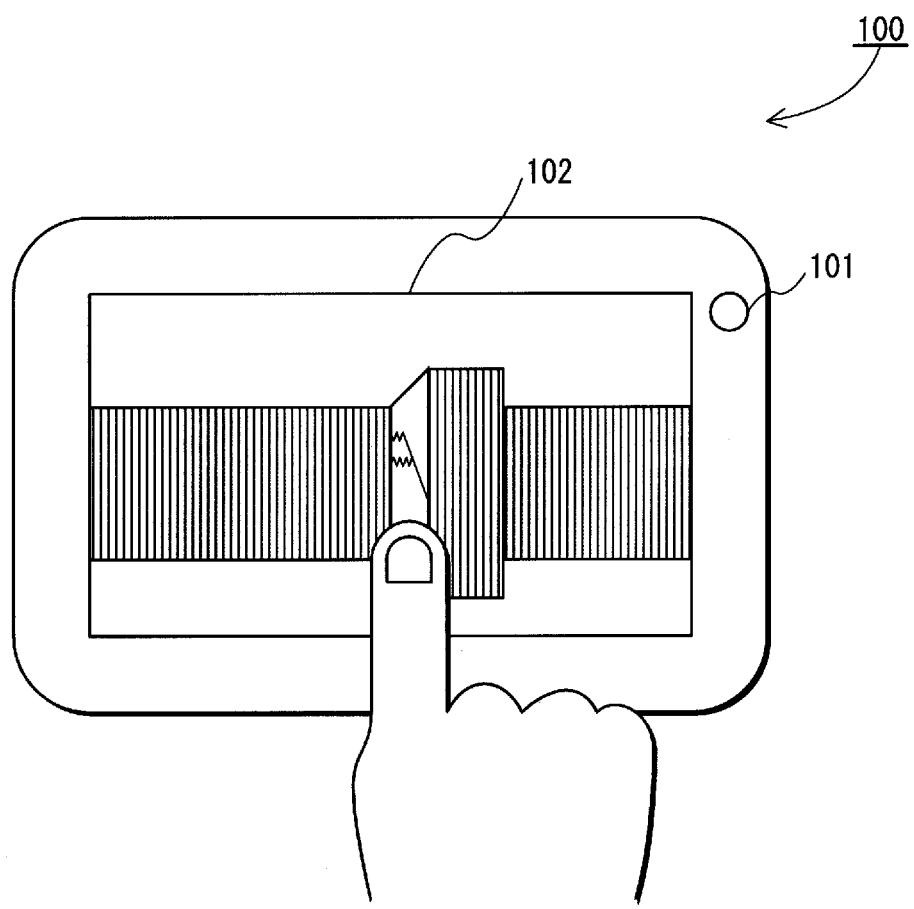
FIG. 1 exemplarily shows an external appearance of an image display device 100 pertaining to Embodiment 1 of the present invention as well as the state of use of the image display device 100.

FIG. 1 exemplarily shows an external appearance and operation of an image display device 100 pertaining to Embodiment 1.

As shown in FIG. 1, the image display device 100 includes, as hardware, a power button 101 for activating the image display device itself and a touchscreen 102. Although not illustrated, the image display device 100 also includes memory and CPU (Central Processing Unit).

The touchscreen 102 is a pressure-sensitive touchscreen that can detect a touch made by an indicator such as a finger and a stylus. The touchscreen 102 is composed of a touch sensor that detects a location of a touch operation (an operation location), a pressure-sensitive sensor that detects a pressure level of pressure applied by the touch operation, and a liquid crystal display that displays a screen. The touch sensor and the pressure-sensitive sensor are each made of a transparent material, and are overlaid on the liquid crystal display.

The memory stores therein a program that is executed to achieve the functions of the image display device 100, as well as data used by that program.

The CPU executes the program stored in the memory.

Figure 2:
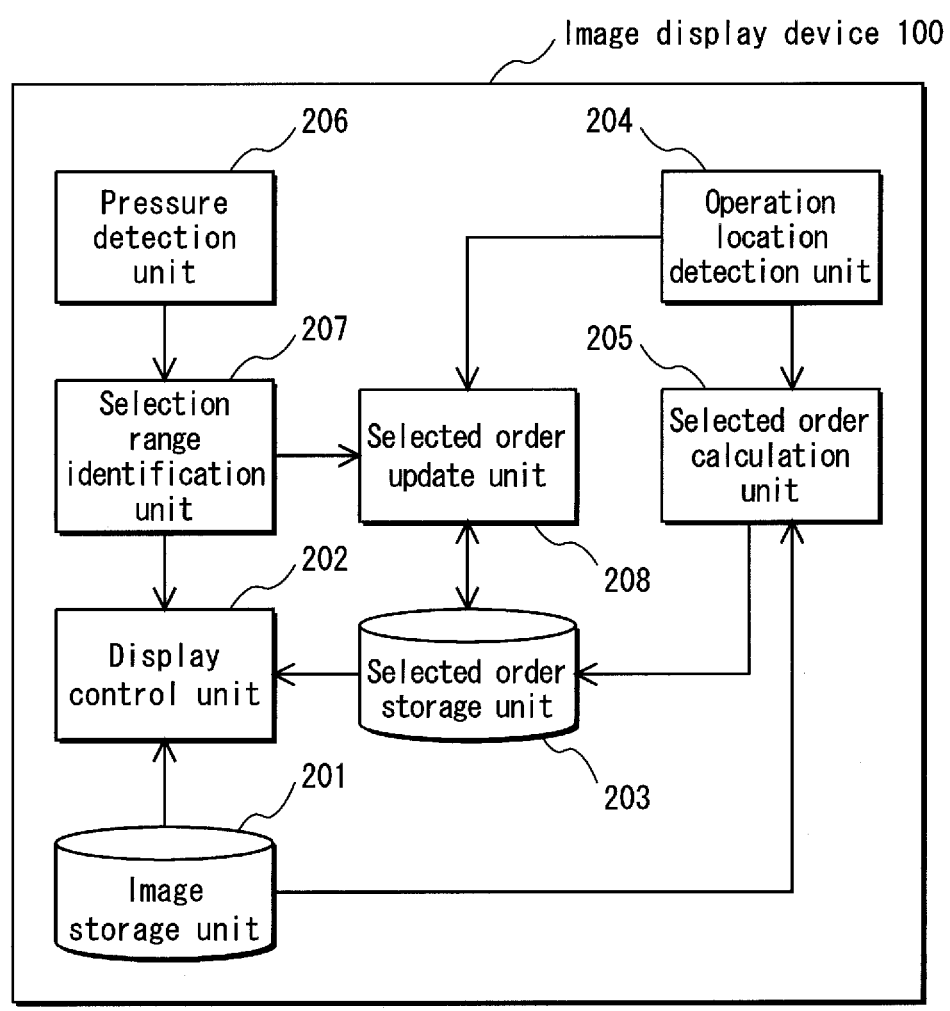
FIG. 2 shows a functional structure of the image display device 100.

As shown in FIG. 2, the image display device 100 includes the following as the structure of each function achieved by the above-described hardware: an image storage unit 201; a display control unit 202; a selected order storage unit 203; an operation location detection unit 204; a selected order calculation unit 205; a pressure detection unit 206; a selection range identification unit 207; and a selected order update unit 208.

The functions of the display control unit 202, the selected order calculation unit 205, the selection range identification unit 207 and the selected order update unit 208 are achieved by the CPU executing the program stored in the memory. The image storage unit 201 and the selected order storage unit 203 are achieved by the memory.

The image storage unit 201 stores therein a plurality of images to be displayed (display targets) by the image display device 100. Each image is arranged in sequence according to the date/time on/at which it is created, and is stored in correspondence with an order indicating its sequence. Here, the orders of the images are sequential numbers, with the order of the first image being 0. Therefore, the largest value that an order of an image can take is the total number of images −1.

Figure 3:
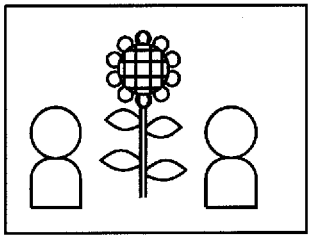
FIG. 3 shows an example of a correspondence relationship between images stored in an image storage unit 201 and orders of the images.
Figure 3:
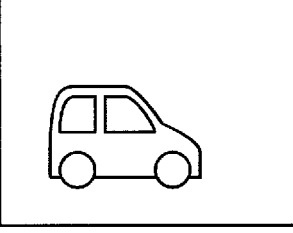
Figure 3:
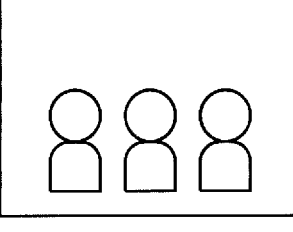
Figure 3:
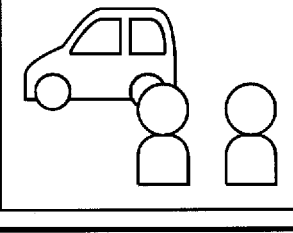

FIG. 3 shows an example case where 20000 images are stored in the image storage unit 201. The orders of the images fall within a range of 0 to 19999. Each order is associated with a different one of the 20000 images.

The display control unit 202 causes the liquid crystal display of the touchscreen 102 to display a screen for searching for and viewing the images.

Figure 4A:
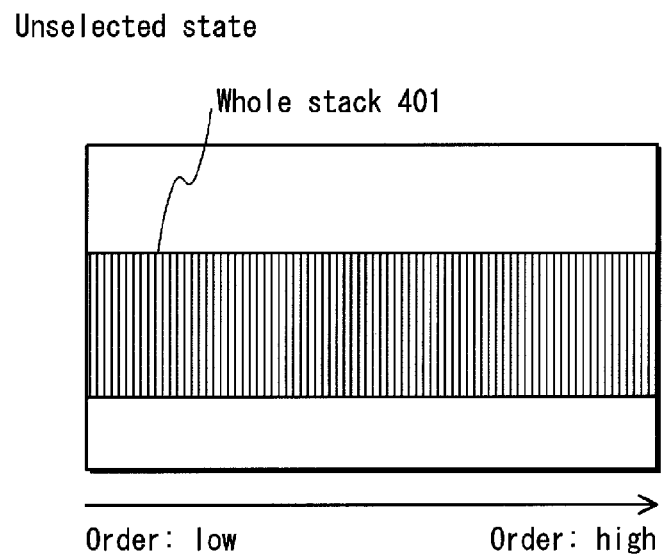
FIGS. 4A and 4B exemplarily show two states of a screen displayed on a touchscreen 102.
Figure 4B:
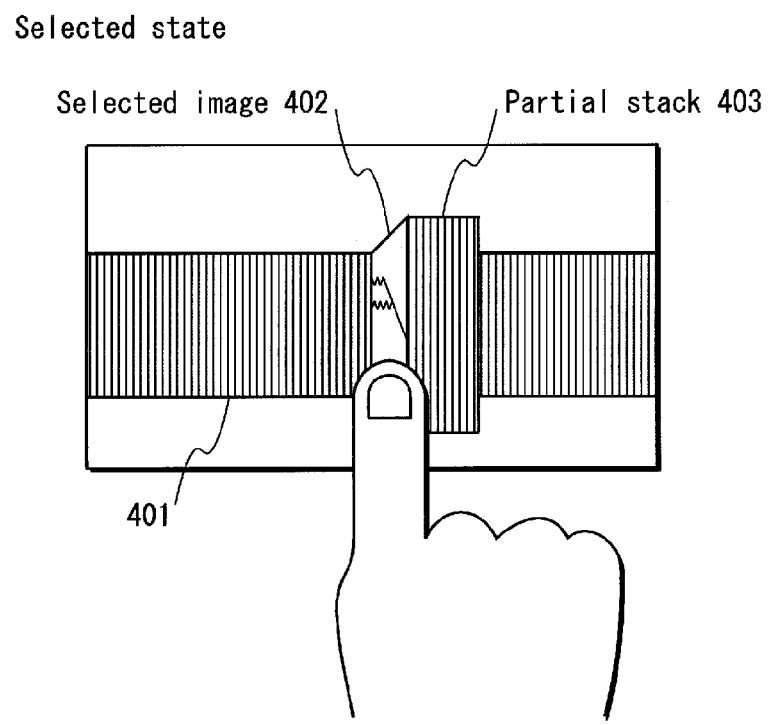

There are two states of the image display device 100. One is an unselected state where no image is selected; the unselected state is displayed in the mode shown in FIG. 4A. The other is a selected state where an image has been selected by performing a touch operation on the touchscreen 102; the selected state is displayed in the mode shown in FIG. 4B.

It should be noted that, although not illustrated, performing a predetermined operation (e.g., releasing the indicator from the touchscreen 102) would display the selected image only, and touching the touchscreen 102 again would cause the image display device 100 to return to the unselected state.

In the unselected state, a whole stack 401 showing all of the images stored in the image storage unit 201 is displayed so as to take up the whole width of the screen; in this mode, the whole stack 401 represents all of the images that are layered in a stack representing a paper stack and that are viewed from the side. In the selected state, a partial stack 403 is displayed as if it is being pulled out from the whole stack 401 toward the front; in this mode, the partial stack 403 represents a group of images that are layered in a stack, the group of images being made up of the selected image (402) and several other images whose orders are in the vicinity of the order of the selected image.

Here, the number of images included in the partial stack 403 is referred to as a selection range. The partial stack 403 is displayed while adjusting an interval at which the images indicated by the number of the selection range are layered, so that these images fit within a predetermined width on the screen. Note that the term "partial stack" is still used when the selection range is one.

Figure 5A:
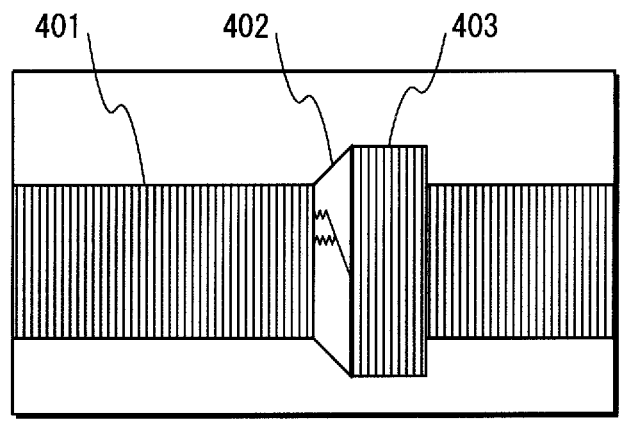
FIGS. 5A and 5B show a difference in display modes of a partial stack 403 arising from a difference in selection ranges.
Figure 5B:
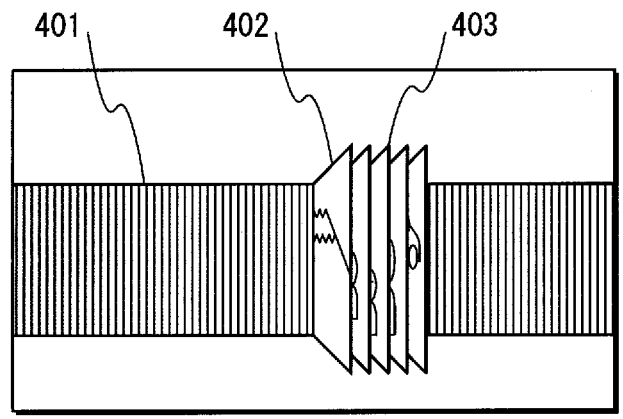

By way of example, FIGS. 5A and 5B show a difference in modes of the partial stacks 403 arising from a difference in selection ranges. FIG. 5A shows mode pertaining to a case where the selection range is fifty, and FIG. 5B shows mode pertaining to a case where the selection range is five.

In the example of FIG. 5A, the selection range is fifty, i.e., large. Thus, the partial stack 403 is displayed in such a manner that display targets are closely layered. As shown, a large number of images are being pulled out as the partial stack 403. Here, for all of the images in the partial stack 403, only their edges are displayed, except for the selected image 402 located at the top of the partial stack 403.

In the example of FIG. 5B, the selection range is five, i.e., small. Thus, the partial stack 403 is displayed in the mode where display targets are layered at a relatively large interval. At this time, not only the selected image 402 but also other display targets included in the partial stack 403 are partially displayed, therefore allowing a user to check their contents.

Each of the display targets included in the whole stack 401 and the partial stack 403 is displayed such that the larger value the order of the corresponding image has, the further rightward the display target is located on the screen. If the partial stack 403 is to be at a location that cannot be displayed within a display area of the touchscreen 102, then the location of the partial stack 403 is adjusted to enable display of the partial stack 403 within the display area.

The selected order storage unit 203 is a memory area for storing therein a selected order indicating the order of the selected image. The selected order stored in the selected order storage unit 203 is used by the display control unit 202.

The operation location detection unit 204 is achieved by the touch sensor of the touchscreen 102. The operation location detection unit 204 detects an operation location and transmits the detected operation location to the selected order calculation unit 205 and the selected order update unit 208.

Figure 6:
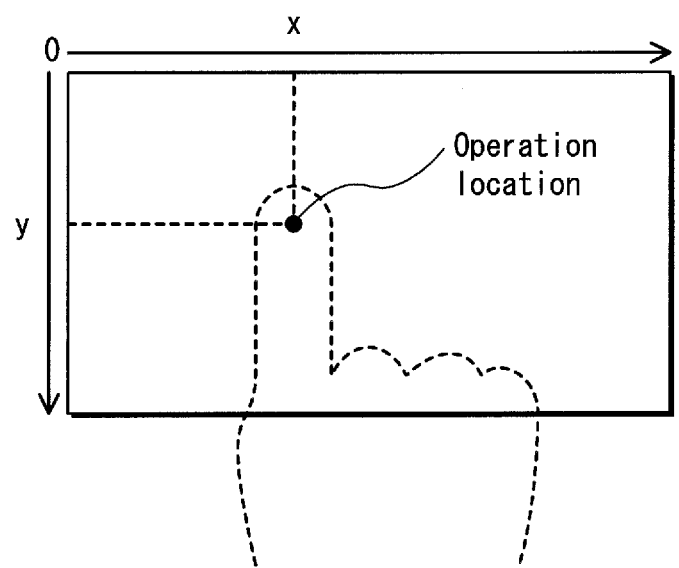
FIG. 6 shows coordinates of an operation location on the touchscreen 102.

The operation location is a location on the touchscreen 102, and as shown in FIG. 6, is expressed by coordinates based on the number of pixels, with the upper left corner of the touchscreen 102 serving as an origin.

For example, in a case where the number of pixels in the touchscreen 102 is 640 pixels in width×360 pixels in height, the operation location falls within a range of (0,0) to (639, 359).

When a touch is detected during the unselected state, the selected order calculation unit 205 calculates a selected order and stores the calculated selected order into the selected order storage unit 203. For example, when the selected order is 296, an image with the order 296 is selected and considered as a selected image.

The calculation of the selected order is performed in accordance with the following Expression 1 by using the operation location detected by the operation location detection unit 204.

Selected order=total number of images×($x$ coordinate of operation location/width of screen)     [Expression 1]

Here, when a result of the calculation is a decimal, the decimal is made into an integer by truncating the digits after the decimal point.

For example, provided that the total number of images is 20000, the x coordinate of the operation location is 543 and the width of the screen is 640, the result of the calculation is 20000×543/640=16968.75. Since the digits after the decimal point are truncated, the selected order is 16968.

The pressure detection unit 206 is achieved by the pressure-sensitive sensor of the touchscreen. The pressure detection unit 206 detects the pressure level of pressure applied by the touch operation and transmits the detected pressure level to the selection range identification unit 207.

The output from the pressure-sensitive sensor is expressed by an integer in a range of 0 to 10 according to the pressure level. Hereinafter, the term "pressure level" refers to this output. Here, a pressure level of 0 indicates that no touch has been made. Regarding a pressure level of 1 or more, a larger numerical value indicates a stronger touch.

The selection range identification unit 207 identifies a selection range used by the display control unit 202 and the selected order update unit 208. The selection range is obtained with the use of a correspondence table of FIG. 7, which shows combinations of a pressure level and selection range.

For example, when the pressure detection unit 206 has detected a pressure level of 5, a selection range of 50 is obtained from the table of FIG. 7.

When the operation location has moved during the selected state, the selected order update unit 208 changes the selected order stored in the selected order storage unit 203 by the selection range calculated by the selection range identification unit 207. More specifically, when the operation location has moved to the right, the selected order update unit 208 increases the selected order by the selection range. When the operation location has moved to the left, the selected order update unit 208 decreases the selected order by the selection range.

Figure 8A:
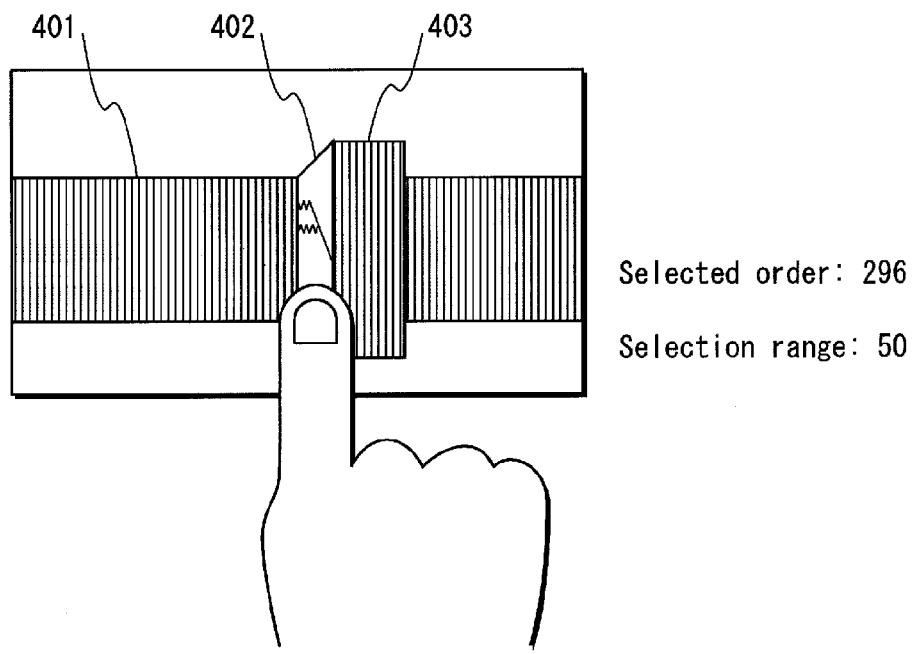
FIGS. 8A and 8B show a change in a selected order caused by an operation.
Figure 8B:
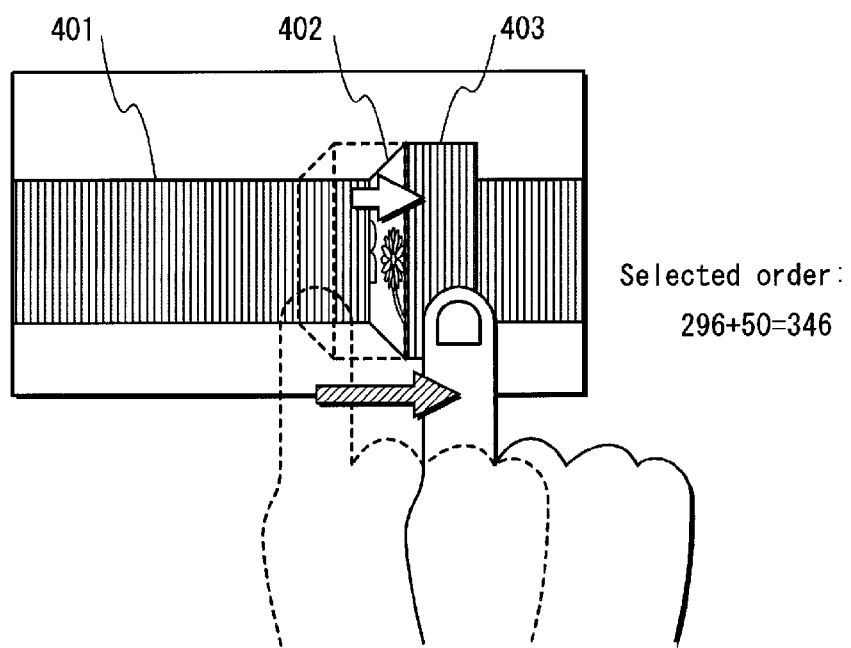

For example, provided that a pre-change selected order is 296, the selection range is 50 and the operation location has moved to the right as shown in FIGS. 8A and 8B, a post-change selected order is 296+50=346.

1-2. Operations

Figure 9:
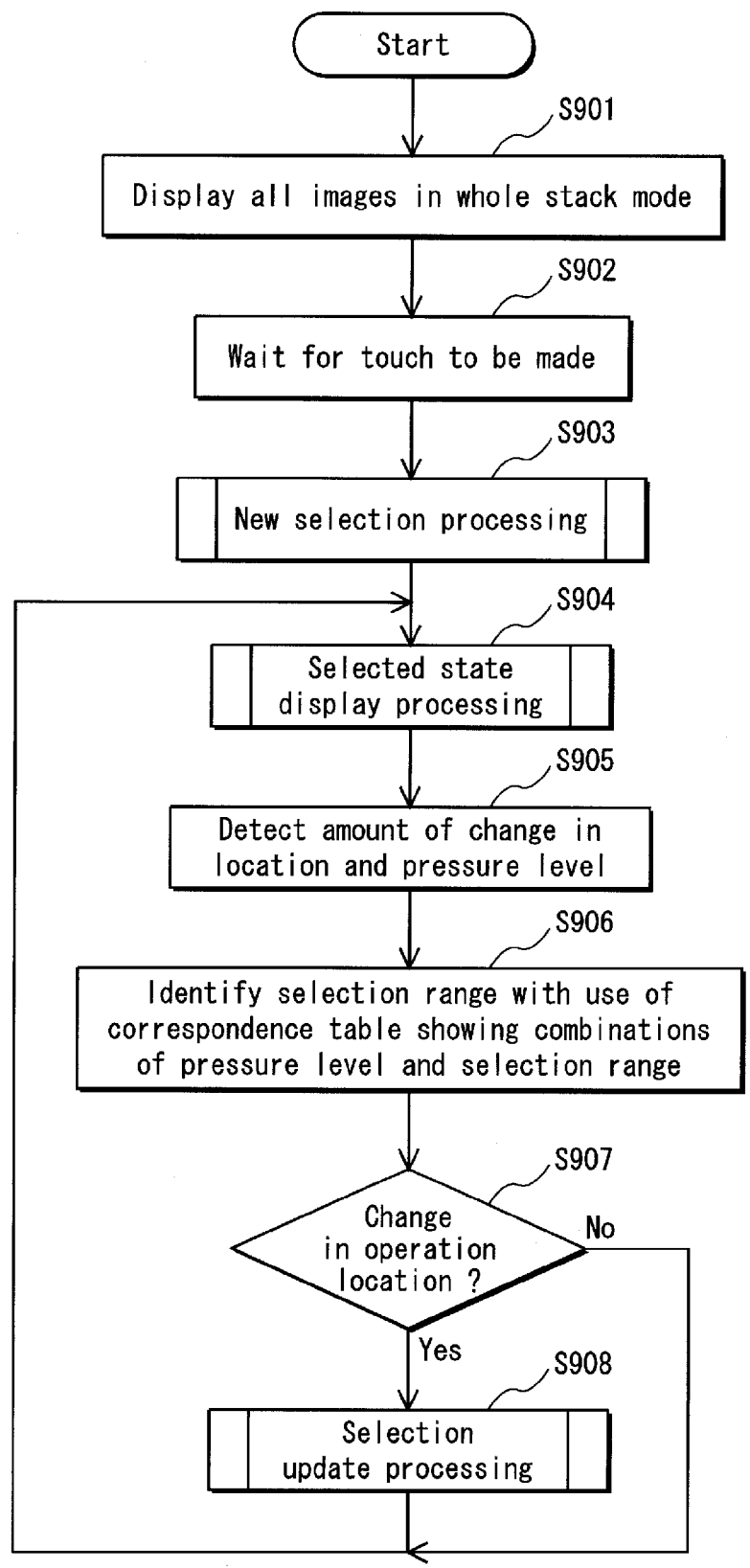
FIG. 9 is a flowchart showing processing performed by the image display device 100.

The following describes processing performed by the image display device 100 in accordance with a flowchart of FIG. 9.

A default state of the image display device 100 is the unselected state. After the power is turned on, first of all, the display control unit 202 performs display processing associated with the unselected state (step S901).

The display processing associated with the unselected state is to display all of the images on the touchscreen 102 in whole stack mode, in which all of the images are layered in a horizontal direction.

Next, the image display device 100 waits for a touch to be made on the touchscreen 102 (step S902). In other words, the image display device 100 waits until the pressure level detected by the pressure detection unit 206 becomes 1 or more.

Once a touch has been made on the touchscreen 102, the selected order calculation unit 205 and the selection range identification unit 207 perform new selection processing, which will be described later (step S903). Thereafter, the image display device 100 makes the transition to the selected state.

During the selected state, the display control unit 202 performs selected state display processing, which will be described later (step S904).

Next, the operation location detection unit 204 and the pressure detection unit 206 detect the operation location and pressure level, respectively (step S905).

Although not illustrated in FIG. 9, if the pressure level becomes 0 as a result of, for example, the indicator being released from the touchscreen 102, then only the selected image will be displayed on the touchscreen 102 and the processing will be ended. Thereafter, if a touch on the touchscreen 102 is detected again, the processing is resumed from step S901.

The selection range identification unit 207 identifies a selection range by using the detected pressure level (step S906). The selection range is identified with the use of the correspondence table of FIG. 7, which shows combinations of a pressure level and selection range.

Then, the selected order update unit 208 compares the operation location detected by the operation location detection unit 204 with an operation location that was previously detected, and judges whether or not the former operation location has changed from the latter operation location (step S907).

If the former operation location has changed from the latter operation location (the YES branch of step S907), the selected order update unit 208 performs selection update processing, which will be described later (step S908), and the processing returns to step S904. If the former operation location has not changed from the latter operation location (the NO branch of step S907), no operation is performed and the processing returns to step S904.

1-2-1. New Selection Processing

The following describes the new selection processing performed by the selected order calculation unit 205 and the selection range identification unit 207.

Figure 10:
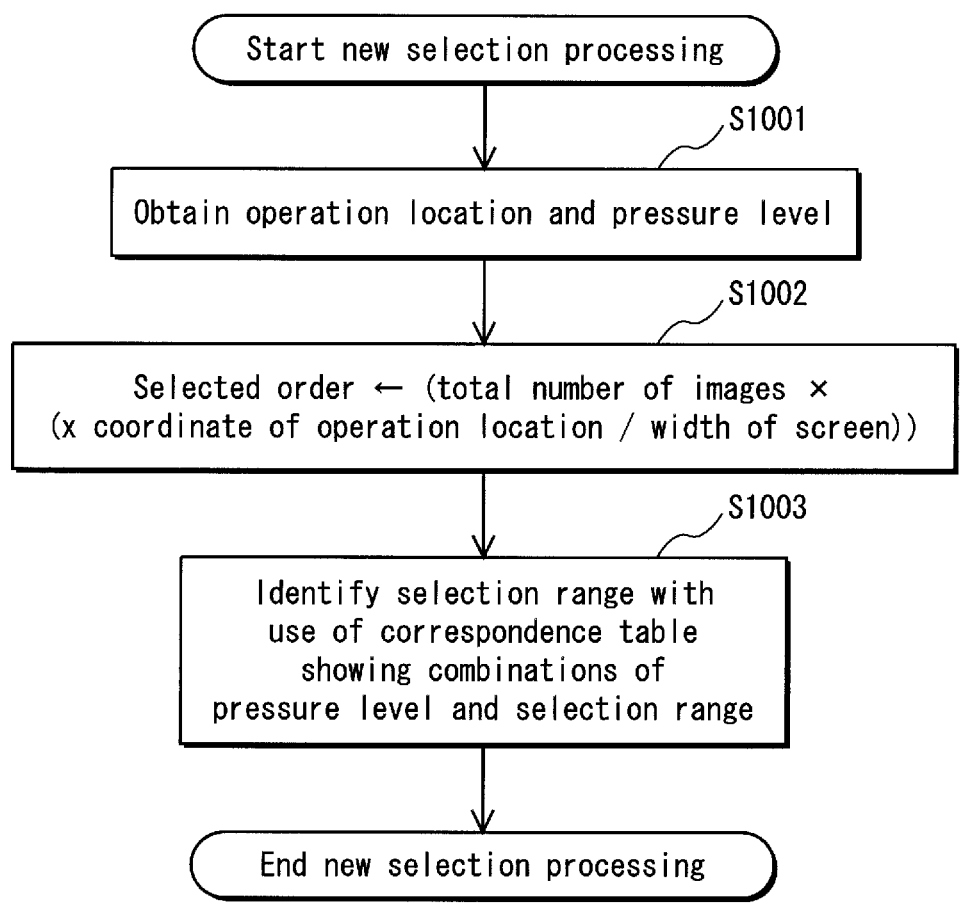
FIG. 10 is a flowchart showing new selection processing.

The new selection processing is processing to calculate the selected order for selecting an image and identify the selection range in the unselected state. The flow of the new selection processing is shown in FIG. 10.

First, the detected operation location at which the touch has been made is obtained from the operation location detection unit 204, and the detected pressure level is obtained from the pressure detection unit 206 (step S1001).

Next, the selected order calculation unit 205 calculates the selected order based on the operation location (step S1002). This calculation of the selected order is performed in accordance with the above-mentioned Expression 1.

Thereafter, the selection range identification unit 207 identifies the selection range based on the pressure level (step S1003), and the new selection processing is ended. The selection range is identified with the use of a correspondence table of FIG. 7, which shows combinations of a pressure level and selection range.

1-2-2. Selected State Display Processing

The following describes the selected state display processing performed by the display control unit 202.

Figure 11:
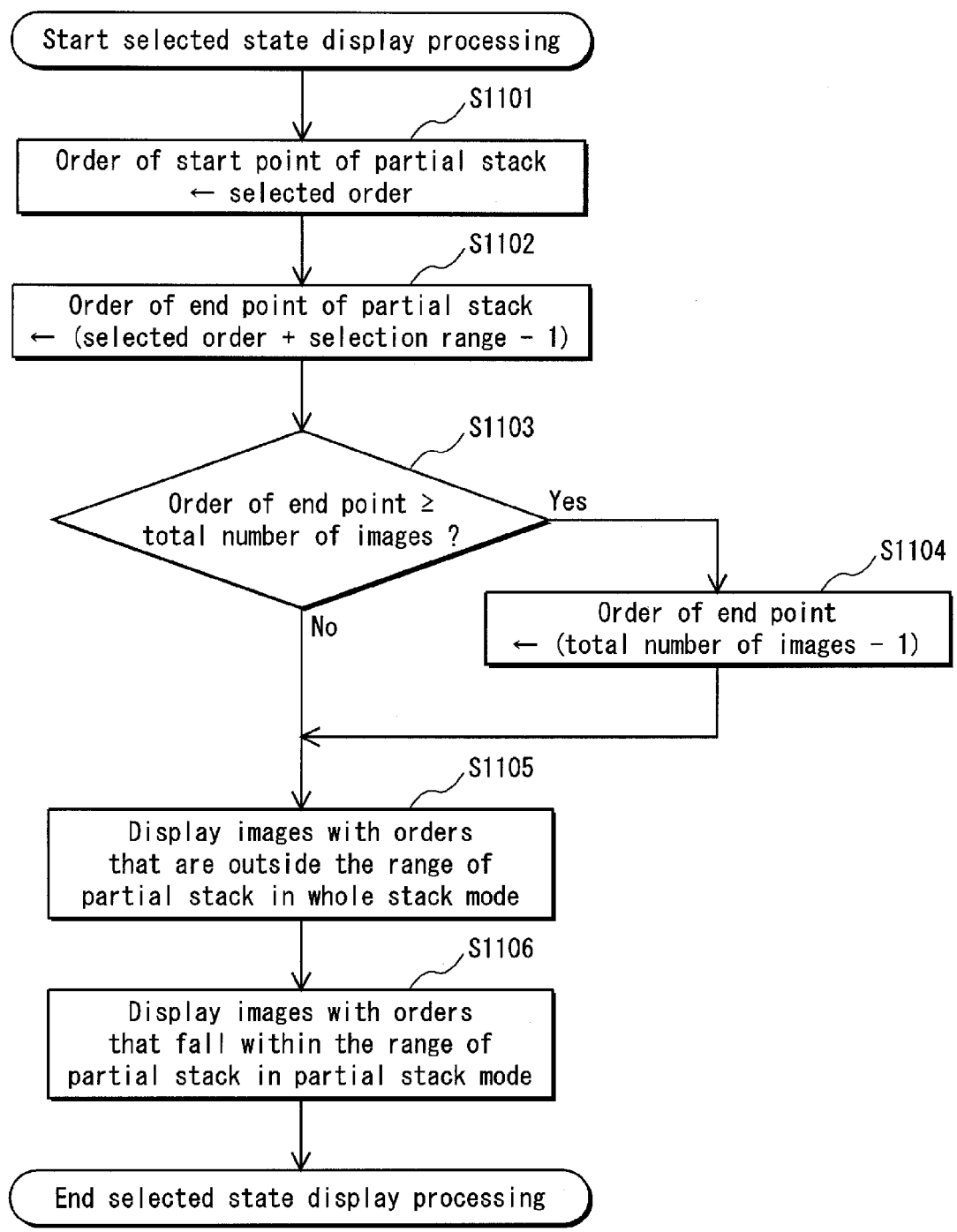
FIG. 11 is a flowchart showing selected state display processing.

The selected state display processing is processing to display the selected image on the touchscreen 102 in the mode where a partial stack is pulled out from the whole stack. The flow of the selected state display processing is shown in FIG. 11.

First of all, a range of the orders of images to be included in the partial stack is identified, with a start point of the range being the selected order (step S1101), and an end point of the range being the selected order+the selection range−1 (step S1102).

For example, when the selected order is 16968 and the selection range is 50, the order of the start point is 16968, and the order of the end point is 16968+50−1=17017. That is, the images with orders in a range of 16968 to 17017 are included in the partial stack.

Next, it is judged whether the order of the end point of the partial stack is larger than or equal to the total number of images stored in the image storage unit 201 (step S1103). Put another way, it is judged whether the range of the partial stack exceeds a range of images that can be displayed.

When the order of the end point of the partial stack is larger than or equal to the total number of images stored in the image storage unit 201 (the YES branch of step S1103), the order of the end point of the partial stack is corrected to the total number of images stored in the image storage unit 201−1 (step S1104). This way, the range of the partial stack fits within the range of images that can be displayed.

By way of example, assume a case where the selected order is 16968, the selection range is 50 and the total number of images stored in the image storage unit 201 is 17000. In this case, a range of orders of the images stored in the image storage unit 201 is 0 to 16999. Here, the order of the end point of the partial stack is 17017, which is larger than the total number of images stored in the image storage unit 201 (i.e., 17000). Therefore, the order of the end point is corrected to 17000−1=16999.

Next, the images with orders that are outside the range of the partial stack are displayed in the whole stack mode, in which they are layered in the horizontal direction (step S1105). The images with orders that fall within the range of the partial stack are displayed in partial stack mode as if they are being pulled out from the whole stack toward the front (step S1106).

1-2-3. Selection Update Processing

The following describes the selection update processing performed by the selected order update unit 208.

Figure 12:
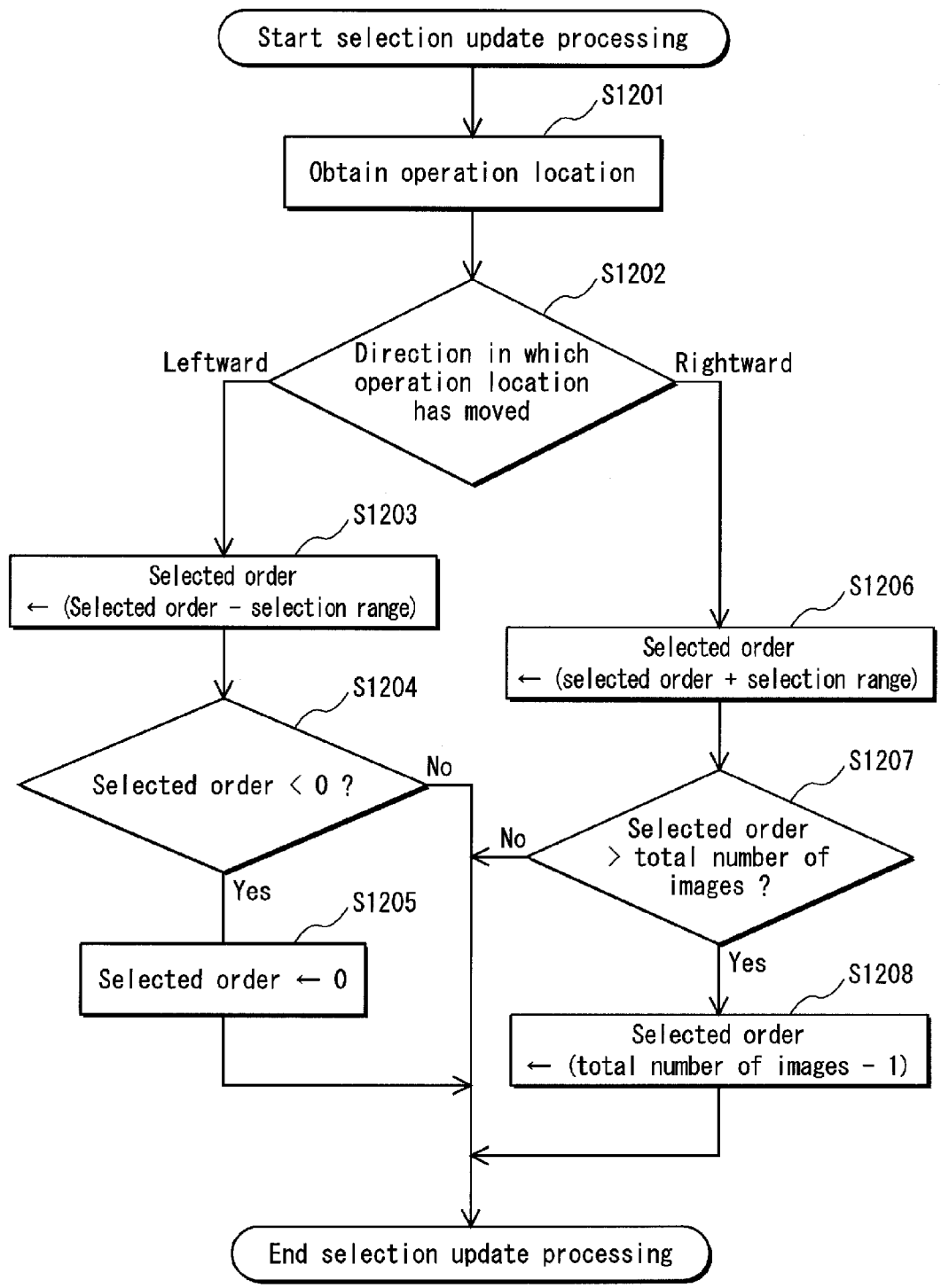
FIG. 12 is a flowchart showing selection update processing.

The selection update processing is processing to update a range to be displayed as a partial stack. The flow of the selection update processing is shown in FIG. 12.

First of all, the selected order update unit 208 obtains the operation location and the pressure level from the operation location detection unit 204 and the pressure detection unit 206, respectively (step S1201).

Next, the selected order update unit 208 compares the obtained operation location with a previous operation location, and judges whether the direction in which the obtained operation location has moved from the previous operation location is leftward or rightward (step S1202).

When judging that the direction is leftward (the Leftward branch of step S1202), the selected order update unit 208 updates the current selected order by reducing the current selected order by the selection range (step S1203).

For example, when the current selected order is 16968 and the selection range is 50, the updated selected order is 16968−50=16918.

Then, the selected order update unit 208 judges whether or not the updated selected order is smaller than 0, in order to check whether or not the updated selected order falls within the range of the orders of the images stored in the image storage unit 201 (step S1204).

If the updated selected order is smaller than 0 (the YES branch of step S1204), then the updated selected order is corrected to 0 (step S1205), and the selection update processing is ended. If the updated selected order is larger than or equal to 0 (the NO branch of step S1204), then the selection update processing is directly ended.

For example, when the current selected order is 48 and the selection range is 50, the updated selected order is −2, i.e., smaller than 0. In this case, the updated selected order is corrected to 0 so as to fall within the range of the orders of the images stored in the image storage unit 201.

When judging in step S1202 that the direction in which the obtained operation location has moved from the previous operation location is rightward (the Rightward branch of step S1202), the selected order update unit 208 updates the current selected order by increasing the current selected order by the selection range (step S1206).

For example, when the current selected order is 16968 and the selection range is 50, the updated selected order is 16968+50=17018.

Then, the selected order update unit 208 judges whether the updated selected order is larger than or equal to the total number of the images stored in the image storage unit 201, in order to check whether or not the updated selected order falls within the range of the orders of the images stored in the image storage unit 201 (step S1207).

If the updated selected order is larger than or equal to the total number of the images stored in the image storage unit 201 (the YES branch of step S1207), the updated selected order is corrected to the total number of the images stored in the image storage unit 201-1 (step S1208), and the selection update processing is ended. If the updated selected order is smaller than the total number of the images stored in the image storage unit 201 (the NO branch of step S1207), the selection update processing is directly ended.

For example, when the total number of the images stored in the image storage unit 201 is 17000, the current selected order is 16968 and the selection range is 50, the updated selected order is 17018, which is larger than the total number of the images stored in the image storage unit 201 (i.e., 17000). In this case, in order for the updated selected order to not exceed the total number of the images stored in the image storage unit 201, the updated selected order is corrected to the total number of the images stored in the image storage unit 201−1=16999.

2. Embodiment 2

The following describes, as a content display device pertaining to Embodiment 2, an image display device 100a that displays, from among images that each belong to one of a plurality of groups, one or more images that belong to a group selected by a user (a display group).

2-1. Structure

Figure 13:
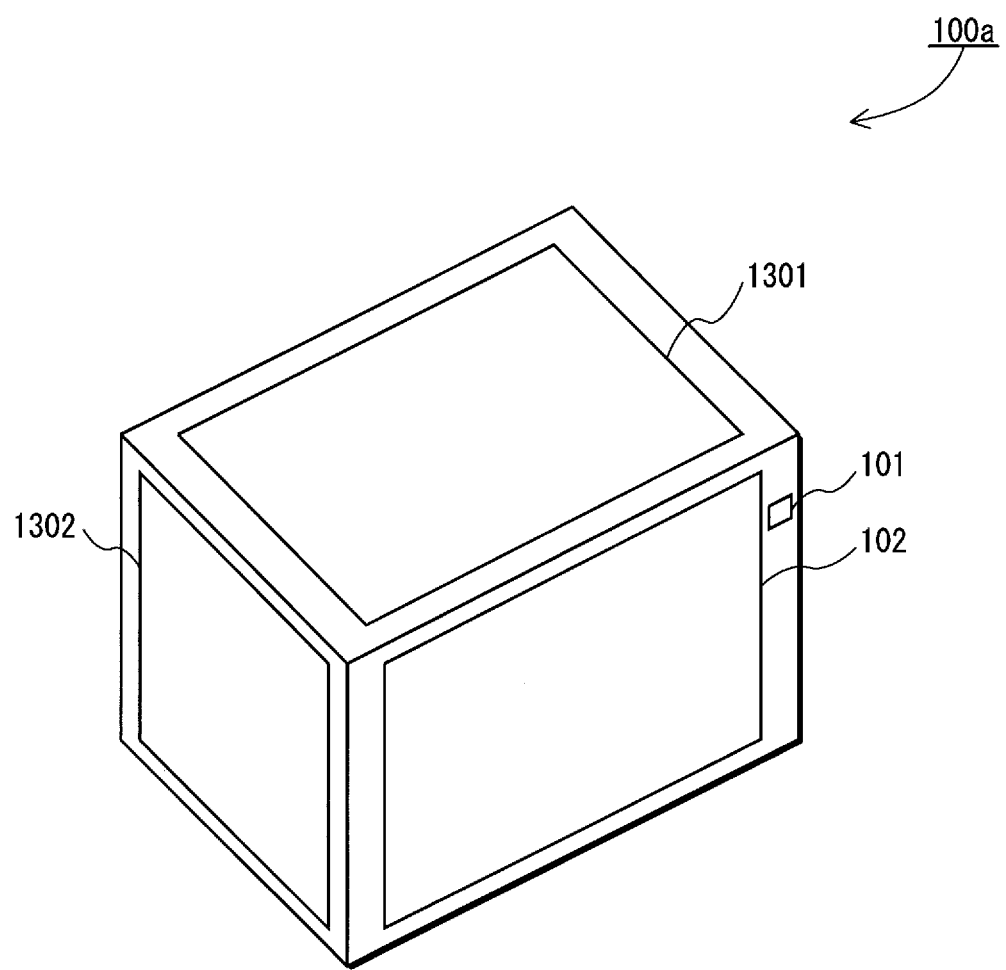
FIG. 13 shows an external appearance of an image display device 100a pertaining to Embodiment 2.

FIG. 13 shows an external appearance of the image display device 100a pertaining to Embodiment 2.

A housing of the image display device 100a has a shape of a rectangular cuboid. In addition to components of the image display device 100 pertaining to Embodiment 1, the image display device 100a includes, as hardware, a group selection touchscreen 1301 placed on the top surface of the housing, and a front display 1302 placed on the front surface of the housing. Other components of the image display device 100a are the same as those of the image display device 100. Also, the touchscreen 102 is placed on one of side surfaces of the housing, and is referred to as a side touchscreen 102 in the following description.

The group selection touchscreen 1301 is used to select a display group, and is achieved by a pressure-sensitive touchscreen composed of a touch sensor and a liquid crystal display.

The front display 1302 displays a selected image that has been selected by a touch operation made on the side touchscreen 102, and is achieved by a liquid crystal display.

Figure 14A:
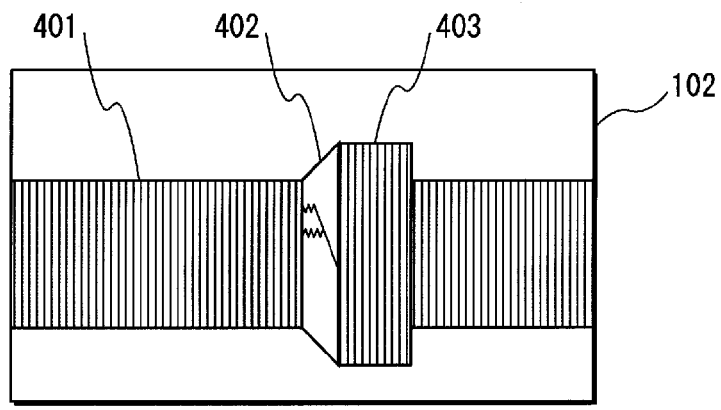
FIGS. 14A, 14B and 14C respectively show examples of contents to be displayed on a side touchscreen 102, a group selection touchscreen 1301 and a front display 1302.
Figure 14B:
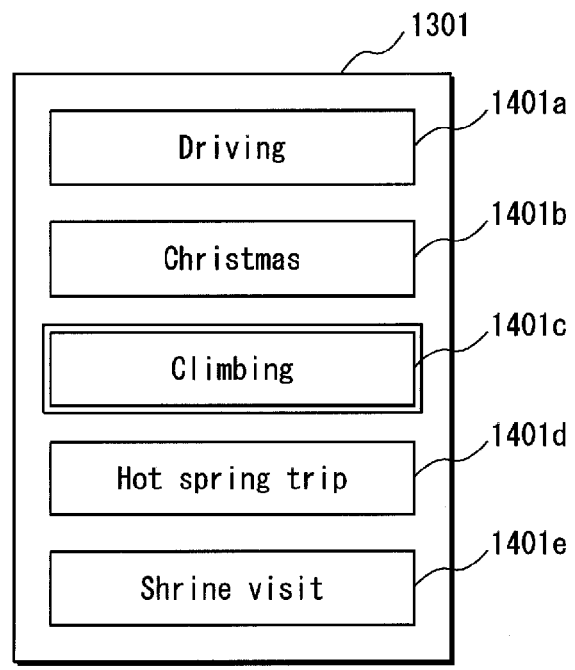
Figure 14C:
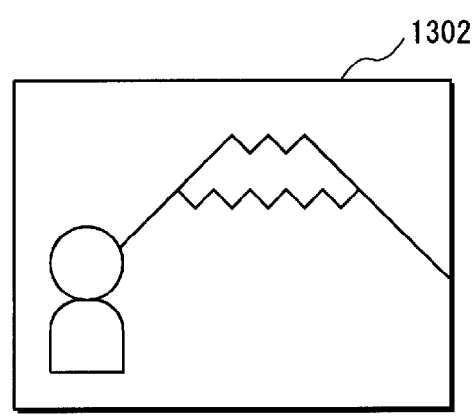

FIGS. 14A, 14B and 14C respectively show examples of contents to be displayed on the side touchscreen 102, the group selection touchscreen 1301 and the front display 1302.

As shown in FIG. 14A, the side touchscreen 102 displays a screen for selecting an image, as with Embodiment 1. However, only the images belonging to the display group selected on the group selection touchscreen 1301 are displayed on the side touchscreen 102 as display targets.

As shown in FIG. 14B, the group selection touchscreen 1301 displays a screen for selecting the display group. On this screen for selecting the display group, rectangles indicating respective groups are displayed. Out of these rectangles, a rectangle indicating the display group is displayed while being emphasized with a double border.

In the example of FIG. 14B, each of rectangular areas 1401a to 1401e is associated with a different one of five groups. This example shows that the group "Climbing" indicated by the rectangular area 1401c is displayed while being emphasized with the double border, and is therefore the display group.

As shown in FIG. 14C, the front display 1302 displays an enlarged version of the image selected on the side touchscreen 102. In the example of FIG. 14C, the front display 1302 displays an entirety of the selected image 402 that is being pulled out in FIG. 14A. It should be noted here that the front display 1302 displays nothing during the unselected state.

Figure 15:
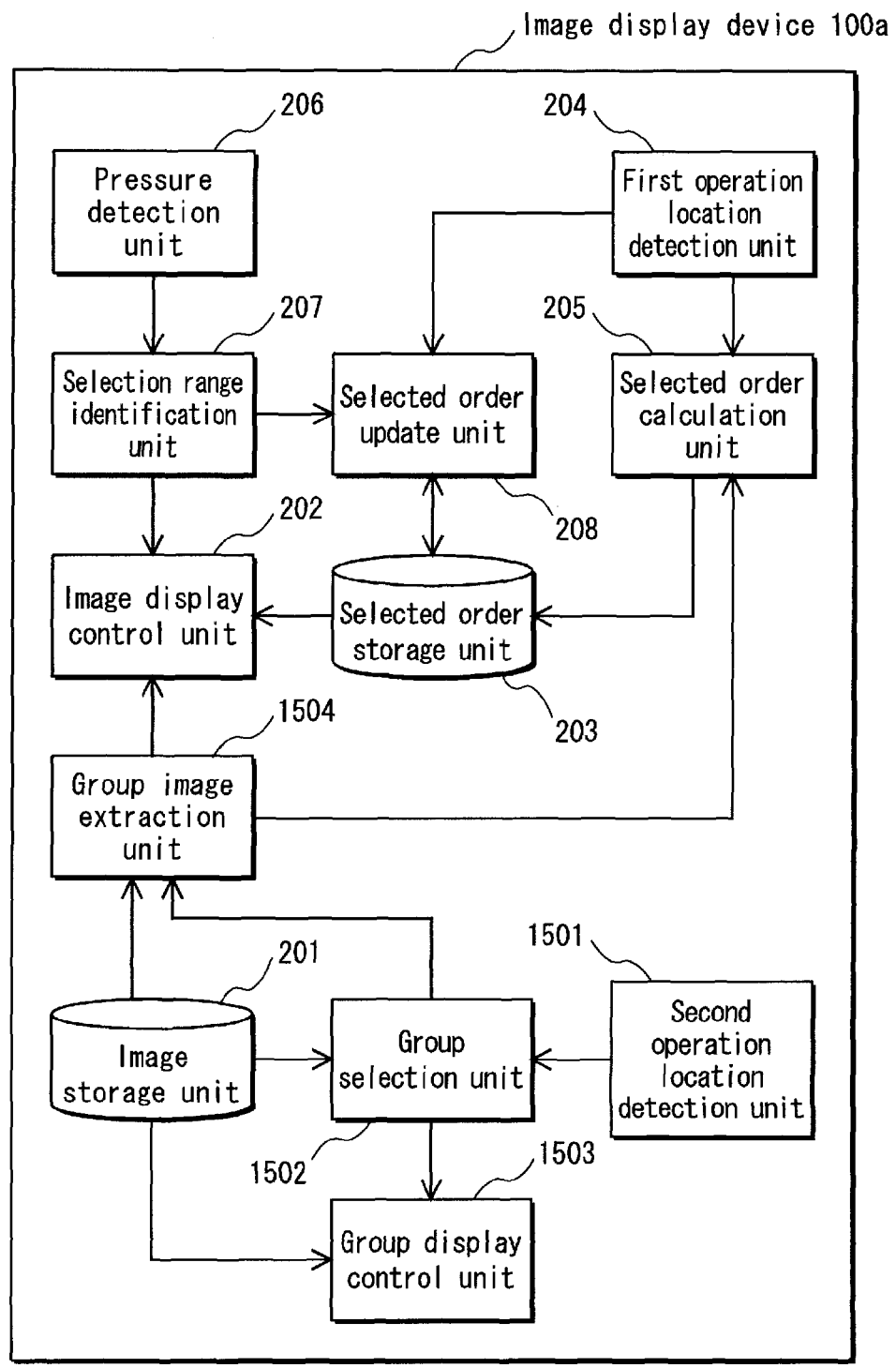

FIG. 15 shows the structure of functions achieved by the image display device 100a.

As shown in FIG. 15, in addition to the structure of the image display device 100, the image display device 100a includes a second operation location detection unit 1501, a group selection unit 1502, a group display control unit 1503, and a group image extraction unit 1504. Note that a first operation location detection unit 204 and an image display control unit 202 are the equivalents of the operation location detection unit 204 and the display control unit 202 of Embodiment 1, respectively, and are therefore assigned the same reference signs as their counterparts in Embodiment 1.

In Embodiment 2, data stored in the image storage unit 201 is modified from Embodiment 1, and the operations of the selected order calculation unit 205 and the image display control unit 202 are partially modified from Embodiment 1.

The functions of the group selection unit 1502, the group display control unit 1503 and the group image extraction unit 1504 are achieved by the CPU executing the program stored in the memory.

Figure 16:
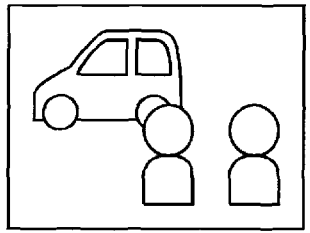
FIG. 16 shows an example of a correspondence relationship between images stored in the image storage unit 201, orders of the images, and groups to which the images belong.
Figure 16:
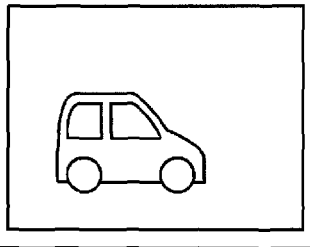
Figure 16:
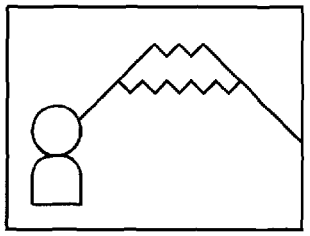
Figure 16:
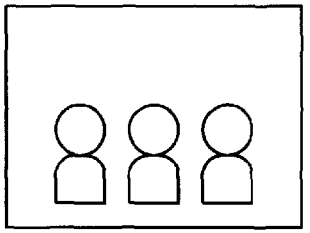

As shown in FIG. 16, the data stored in the image storage unit 201 includes, in addition to images and orders of the images, groups to which the images belong, in one-to-one correspondence. In the example of FIG. 16, the image with the order 0 belongs to the group "Driving", the image with the order 16968 belongs to the group "Climbing", and other images also belong to their respective groups.

The second operation location detection unit 1501 is achieved by the touch sensor of the group selection touchscreen 1301. The second operation location detection unit 1501 detects an operation location upon a selection operation, which is a touch made by a user, and transmits the detected operation location to the group selection unit 1502.

The operation location is a location on the group selection touchscreen 1301, and is expressed by coordinates with the upper left corner of the group selection touchscreen 1301 serving as an origin.

The group selection unit 1502 selects, as a display group, a group corresponding to a rectangular area including the operation location detected by the second operation location detection unit 1501. For example, if the operation location is within the rectangular area 1401b in the state of FIG. 14B, the group "Christmas" will be selected.

The group display control unit 1503 causes the liquid crystal display of the group selection touchscreen 1301 to display a screen for selecting a group, such as the one shown in FIG. 14B. More specifically, the group display control unit 1503 causes the liquid crystal display to display each of the groups stored in the image storage unit 201 in the mode where each of the groups is indicated by a rectangle, with the display group selected by the group selection unit 1502 being emphasized with a double border.

The group image extraction unit 1504 extracts, from the image storage unit 201, the images belonging to the display group selected by the group selection unit 1502, and transmits the extracted images to the selected order calculation unit 205 and the image display control unit 202. At this time, the group image extraction unit 1504 also transmits the number of the images belonging to the display group. When transmitting the extracted images, the extracted images are re-assigned sequential numbers starting from 0 on a per-group basis.

In the example shown in FIG. 17, the group "Climbing" is selected, and 700 images belonging to the group "Climbing"

are extracted. Also, each of the extracted images is newly assigned a different one of orders 0 through 699.

In Embodiment 2, the operations of the selected order calculation unit 205 and the image display control unit 202 are partially modified from Embodiment 1. The selected order calculation unit 205 and the image display control unit 202 of Embodiment 2 use the images extracted by the group image extraction unit 1504, instead of the total number of the images stored in the image storage unit 201. Furthermore, the selected order is calculated by using the number of the images belonging to the display group, instead of the total number of the images stored in the image storage unit 201.

2-2. Operations

A description is now given of parts of the operations that have been modified from Embodiment 1.

Figure 18:
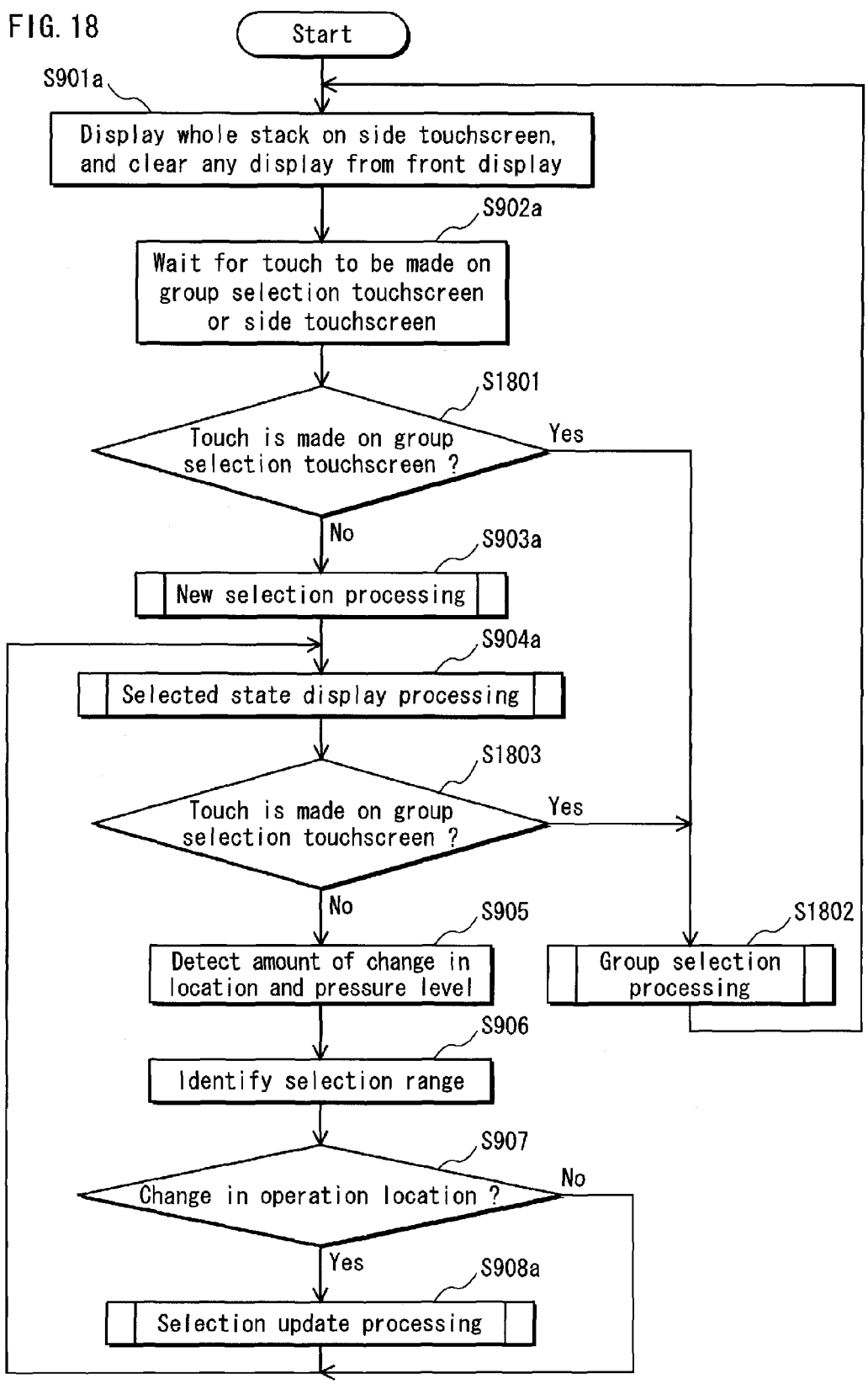

FIG. 18 shows processing performed by the image display device 100a. This processing is partially modified from the processing performed by the image display device 100 pertaining to Embodiment 1 (FIG. 9). The following explains the modified parts.

In the processing to display all of the images on the side touchscreen 102 in the whole stack mode (step S901), not only all of the images are displayed on the side touchscreen 102, but also an image displayed on the front display 1302 is cleared therefrom if such an image is displayed thereon (step S901a).

The processing to wait for a touch to be made on the side touchscreen 102 (step S902) is modified so that the image display device 100a waits for a touch to be made on either one of the side touchscreen 102 and the group selection touchscreen 1301 (step S902a).

When a touch has been detected in step S902a, the image display device 100a judges whether or not the touch has been made on the group selection touchscreen 1301 (step S1801).

When the touch has been made on the group selection touchscreen 1301 (the YES branch of step S1801), the image display device 100a performs group selection processing, which will be described later (step S1802), and the processing returns to step S901a. When the touch has not been made on the group selection touchscreen 1301 (the NO branch of step S1801), it means that the touch has been made on the side touchscreen 102, and therefore the processing moves to step S903a.

The new selection processing (step S903 and FIG. 10) and the selection update processing (step S908 and FIG. 12) are modified so as to use the number of the images extracted by the group image extraction unit 1504, instead of the total number of the images stored in the image storage unit 201 (steps S903a and S908a).

In the selected state display processing (step S904 and FIG. 11), processing to display the selected image on the front display is also performed (step S904a). Also, the selected state display processing is modified so as to display only the images extracted by the group image extraction unit 1504 by using the number of these extracted images, instead of the total number of the images stored in the image storage unit 201.

2-2-1. Group Selection Processing

Figure 19:
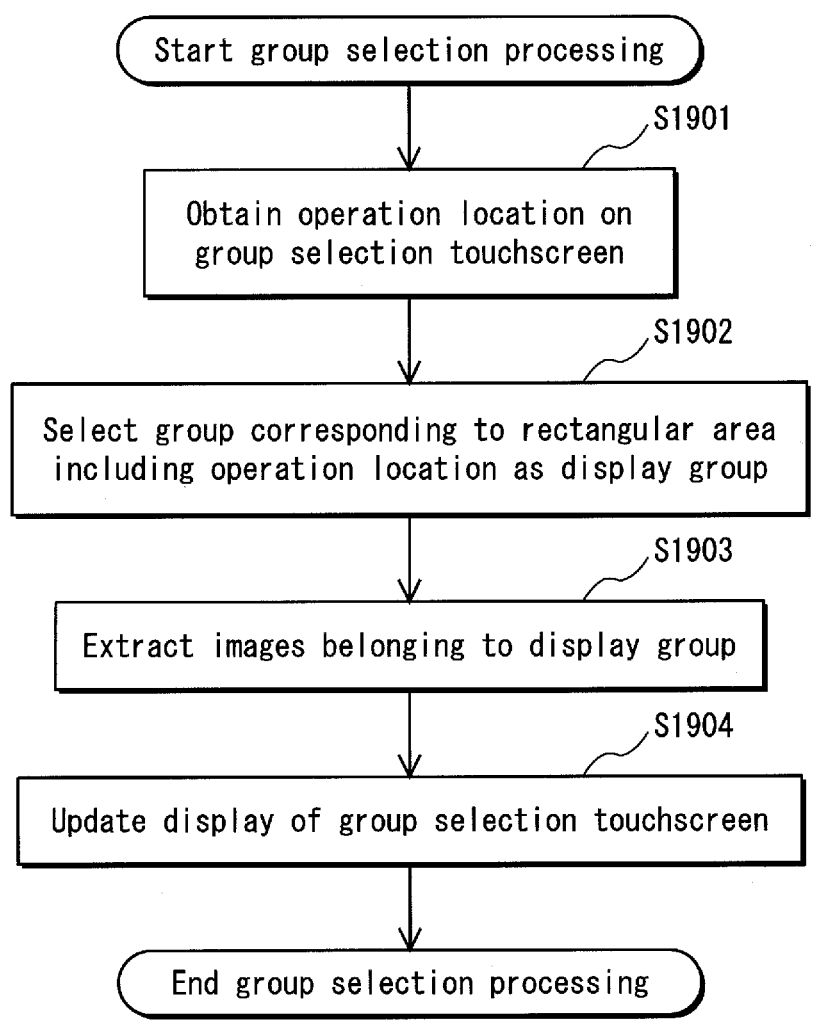
FIG. 19 is a flowchart showing group selection processing.

FIG. 19 shows the group selection processing which has been added in Embodiment 2. The group selection processing is performed when the second operation location detection unit 1501 has detected an operation on the group selection touchscreen 1301.

First, the operation location on the group selection touchscreen 1301 is obtained from the second operation location detection unit 1501 (step S1901).

Next, the group selection unit 1502 selects a group corresponding to a rectangular area including the operation location as the display group (step S1902).

Here, when the operation location is not included within any of the rectangular areas that respectively correspond to the groups, selection of the display group is not performed, and the group selection processing is ended while maintaining the display group that was effective before the group selection processing was started.

For example, if the operation location is included within the rectangular area 1401b shown in FIG. 14B, then the group selection unit 1502 selects the group "Christmas" as the display group.

Thereafter, the group image extraction unit 1504 extracts images belonging to the display group from among the plurality of images stored in the image storage unit 201 (step S1903). At this time, the extracted images are reordered within the group.

Then, display of the group selection touchscreen 1301 is updated (step S1904). To be more specific, the groups are arranged and displayed in the mode where each of the groups is indicated by a rectangle, with the display group being emphasized with a double border.

3. Modification Examples

A content display device pertaining to the present invention has been described above based on Embodiments. However, it goes without saying that the present invention is limited to the content display devices explained above in Embodiments.

(1) The present invention may be a control program composed of program codes for causing the CPU in the content display device and various circuits connected to the CPU to execute the processing explained in Embodiments (see FIGS. 9 through 12) and the like, the control program being disseminated and distributed by being recorded on a recording medium or via various communication paths. Examples of such a recording medium include an IC card, a hard disk, an optical disc, a flexible disk, and a ROM. The disseminated/distributed control program is provided for use by being stored into, for example, memory that can be read by the CPU. The functions described in Embodiments can be achieved by the CPU executing the control program. Part of the control program may be transmitted to another device (CPU) that can execute programs and that is different from the content display device via various networks, and this part of the control program may be executed by the other device.

(2) Part or all of the constituent elements constituting the content display device may be assembled as one or more integrated circuits (IC, LSI, etc.), or may be assembled as an integrated circuit (one chip) together with other elements.

(3) Each of Embodiments has described an image display device as a content display device. However, the contents to be displayed by the content display device need not be recorded in the form of images, as long as they can be displayed. For example, an electronic book, a document file, etc. may be divided into pages, and each page may be regarded as content. Alternatively, frames that constitute video may each be displayed as content.

In such cases, each content can be displayed in place of an image.

(4) In Embodiments, a plurality of images are displayed in the mode where the images are layered in a stack in the horizontal direction. However, the present invention is not limited to this mode, as long as (i) an image assigned an order corresponding to the operation location is selected and displayed during the unselected state, and (ii) the partial stack is displayed during the selected state while changing the selected order based on the pressure level. The following lists examples of various display modes.

Figure 20A:
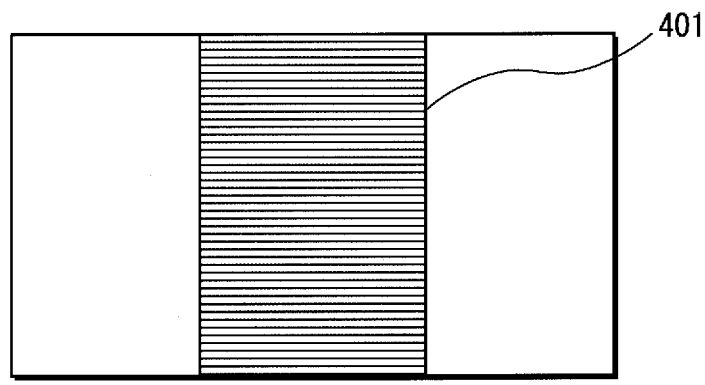
FIGS. 20A and 20B exemplarily show display modes in which images are vertically arranged, the display mode pertaining to one modification example of the image display device.
Figure 20B:
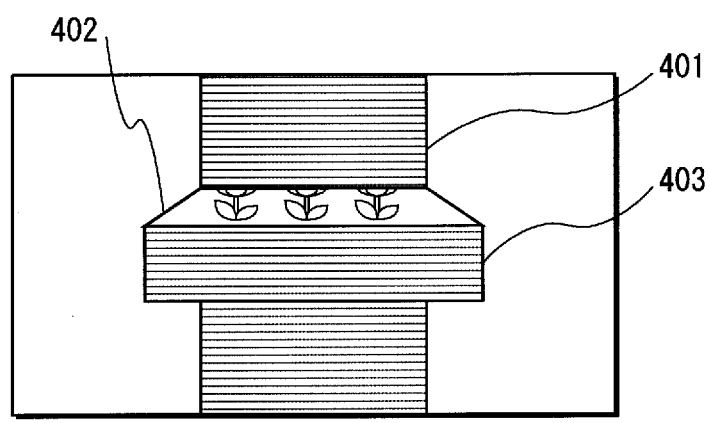

(a) As shown in FIGS. 20A and 20B, images may be displayed in the mode where they are layered in a stack in a vertical direction.

In this case, the selected order may be calculated by using the y coordinate of the operation location and the height of the screen.

Figure 21A:
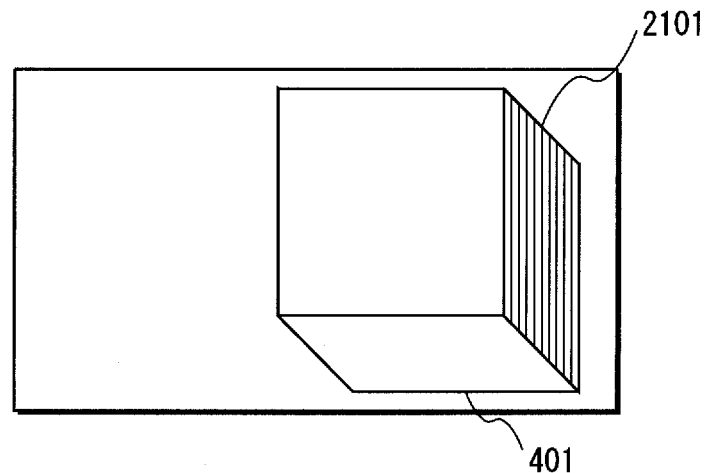
FIGS. 21A and 21B exemplarily show display modes in which an external appearance of a book is displayed, the display mode pertaining to one modification example of the image display device.
Figure 21B:
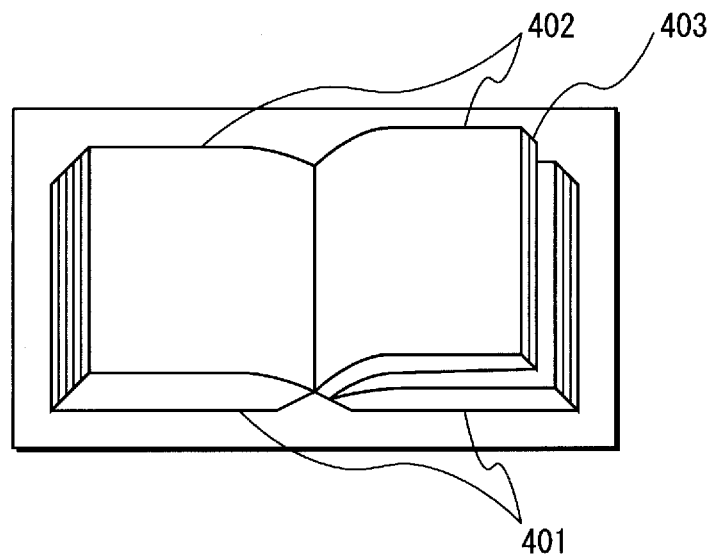

(b) As shown in FIGS. 21A and 21B, images may be displayed in the mode where they altogether represent a book. During the unselected state, the book is displayed in a closed state as shown in FIG. 21A. During the selected state, the book is displayed in an opened state as shown in FIG. 21B.

In this case, during the unselected state, the new selection processing can be performed when a touch is made on a part 2101 corresponding to the fore edge of the book. Here, the selected order is calculated in accordance with a location within the fore edge 2101 at which the touch has been made. For example, the calculation can be performed with use of the following Expression 2.

$$\text{Selected order} = \text{total number of images} \times ((x \text{ coordinate of operation location} - x \text{ coordinate of leftmost side of fore edge})/\text{width of fore edge}) \quad [\text{Expression 2}]$$

Figure 22A:
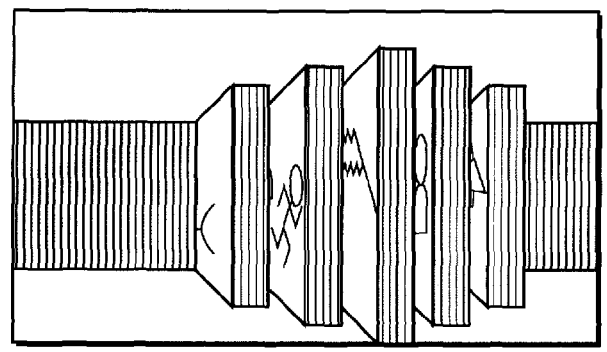
FIGS. 22A, 22B and 22C show variations of display mode for the partial stack 403 pertaining to modification examples of the image display device.
Figure 22B:
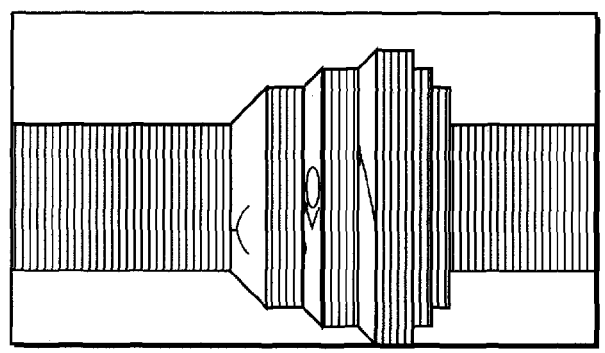
Figure 22C:
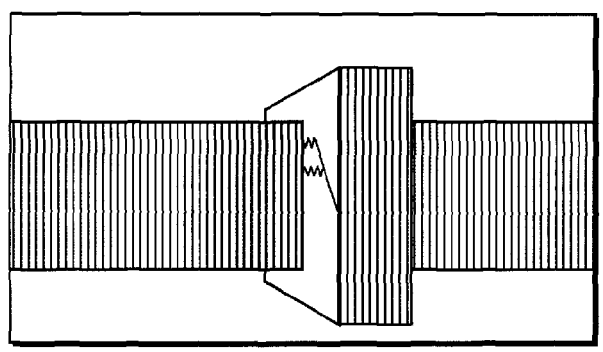

(c) As shown in FIGS. 22A, 22B and 22C, it is permissible to change the way the partial stack is pulled out.

As one example, a plurality of partial stacks may be pulled out as shown in FIG. 22A.

As another example, the partial stack may be pulled out in a stepwise manner as shown in FIG. 22B.

As yet another example, the partial stack may be displayed in the mode where it is enlarged as it is pulled out as shown in FIG. 22C.

Figure 23A:
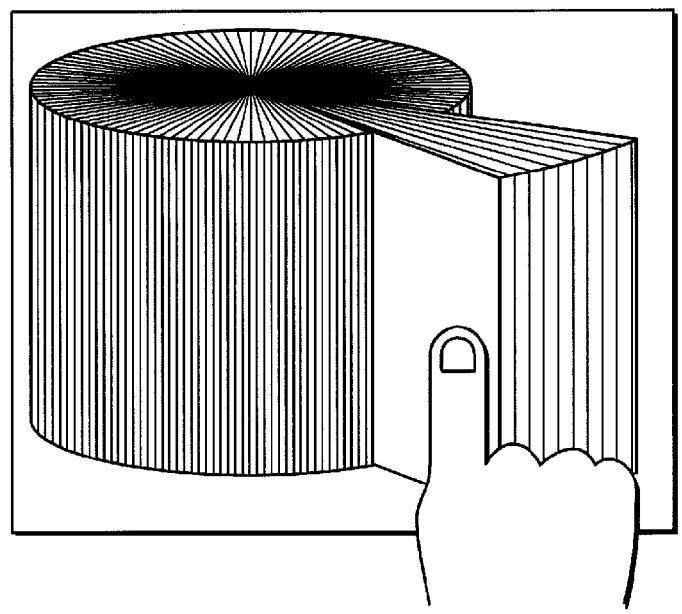
FIGS. 23A and 23B exemplarily show other display modes pertaining to modification examples of the image display device.

(d) Alternatively, images may be displayed while being arranged in the shape of a circular cylinder as shown in FIG. 23A.

In this case, the new selection processing can be performed when a touch is made on a side surface or a bottom surface of the circular cylinder.

Figure 23B:
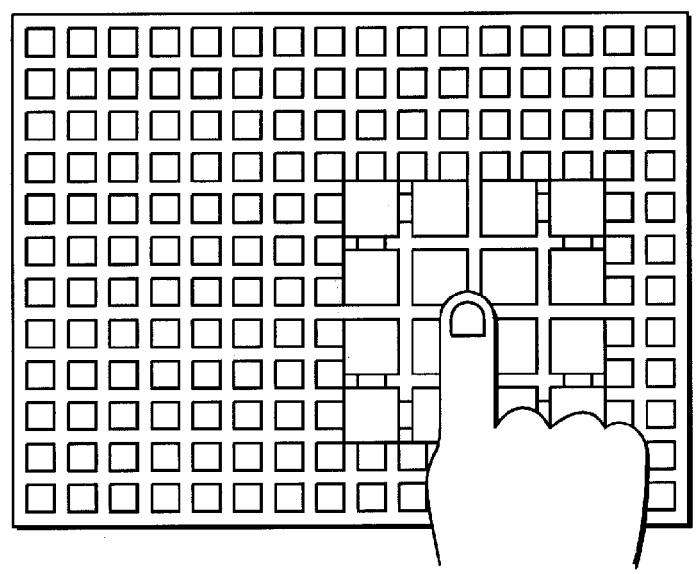

(e) Alternatively, images may be displayed while being arranged in a two-dimensional matrix as shown in FIG. 23B.

In this case, the selected order is calculated by using both the x and y coordinates of the operation location.

(5) In Embodiments, a touchscreen is provided in which an operation member and a display unit are integrated. However, the operation member and the display unit may be separate components.

Figure 24:
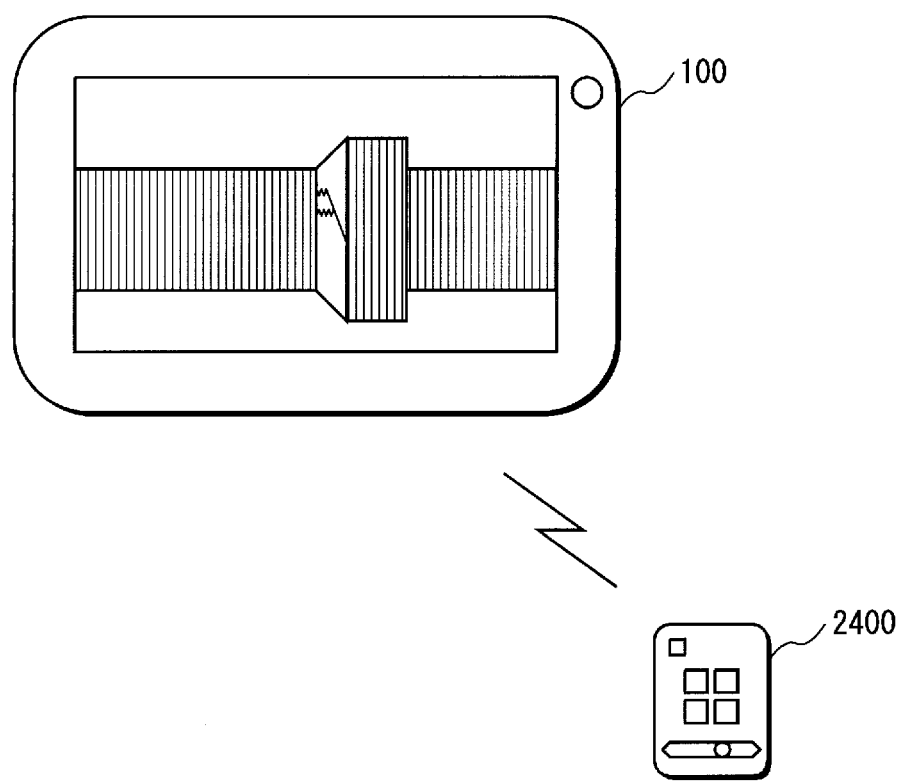
FIG. 24 shows the image display device 100 which is operated via a remote controller 2400.

For example, the operation may be performed with use of a remote controller 2400 as shown in FIG. 24.

(6) Left and right may be reversed in the conditional judgment of the selection update processing (S908, FIG. 12) shown in FIG. 9.

For example, in the modification example (4)(b), it is permissible to achieve the configuration in which moving the operation location to the left results in display of an image on the right. This gives the user the feeling that the operation is similar to an act of flipping over pages of a book.

(7) The touchscreen is not limited to being a pressure-sensitive touchscreen.

For example, the touchscreen may be an electrostatic capacitive touchscreen. In this case, an area of a portion of the touchscreen that is touched by the indicator can be used instead of a pressure level.

(8) The selection range may be obtained outside the scope of the correspondence table shown in FIG. 7, as long as it is obtained based on the pressure level.

For example, it is permissible to use a correspondence table in which a larger pressure level is associated with a wider selection range.

Alternatively, a selection range may not be a fixed value, but may be determined based on a ratio between the selection range and the total number of images.

Alternatively, a selection range may be calculated in accordance with an expression without using any correspondence table. As one example, a selection range can be calculated by using the following Expression 3.

$$\text{Selection rage} = \text{total number of images} \times 0.1^{pressure\ level} \quad [\text{Expression 3}]$$

Furthermore, a selection range need not be calculated by using the pressure level only; it may be calculated by using other values, such as an amount by which the operation location has moved, together with the pressure level.

Furthermore, a selection range may be calculated by using an amount of change in the pressure level.

(9) In Embodiments, a liquid crystal display is used for the touchscreen and the front display. However, an element other than the liquid crystal display may be used for the touchscreen and the front display, as long as it can display images.

For example, an organic EL (ElectroLuminescence) display, a CRT (Cathode Ray Tube) display, and the like may be used instead of the liquid crystal display.

(10) In Embodiments, the images are arranged in sequence in accordance with their image capturing dates/times. However, the images may be arranged in sequence based on different criteria.

For example, the images may be arranged in sequence in accordance with their image sizes, file names, etc.

The sequence of the images may be rearranged by a user operation and the like.

(11) In Embodiments, the image display device comprises memory for storing therein a program and data. However, the image display device may comprise any storage device other than the memory.

For example, the image display device may comprise a hard disk or a flexible disk instead of the memory.

(12) In Embodiments, the images stored in the image storage unit of the image display device are used. However, images obtained from an external device may instead be used.

For instance, provided a detachable memory card is attached to the image display device, images may be obtained from the attached memory card.

Alternatively, provided the image display device holds data relating only to images to be displayed, an image corresponding to the selected order may be downloaded for use from an external server in the form of stream distribution.

(13) In Embodiments, the width of the displayed partial stack is fixed, and the interval at which the images are arranged is determined based on a selection range. However, the width of the displayed partial stack need not be fixed, as long as the partial stack can be displayed in the mode where it is distinguishable from the whole stack.

For example, in the partial stack, images may be spaced from one another at a fixed interval, and the width of the displayed partial stack may be determined based on the selection range.

(14) The orders of the images need not be sequential numbers starting from 0, as long as they can express the sequence of the images.

For example, the orders of the images may be sequential numbers starting from 1, or may be discrete values. In this case, however, it is necessary to change the method of calculating the selected order.

(15) The housing of the image display device pertaining to Embodiment 2, which has been described as having a shape of a rectangular cuboid, may have a different shape.

By way of example, the housing may have a shape of a cube. Alternatively, the housing may have a plate-like shape, and both of the touchscreen and the display may be placed on the same surface of the housing.

(16) The output from the pressure detection unit need not be an integer in a range of 0 to 10, as long as it represents a value associated with the pressure level.

The output from the pressure detection unit may, for example, be a value greater than the range of 0 to 10, or may be a decimal.

(17) Although it has been described that the image display device pertaining to Embodiment 2 does not display anything on the front display during the unselected state, the image display device pertaining to Embodiment 2 may display an image thereon (e.g., an image with the order 0).

(18) In the above Embodiments, the whole stack is displayed so as to take up the whole width of the screen. However, the whole stack may be displayed such that its width is smaller than the width of the screen.

In this case, the calculation of the selected order by the selected order calculation unit 205 (step S1002) can be performed by using the following Expression 4.

Selected order=total number of images×((x coordinate of operation location−x coordinate of leftmost side of whole stack)/width of whole stack displayed on screen)  [Expression 4]

(19) In the above Embodiments, only one selected image is displayed when the indicator is released from the touchscreen. However, a selected image may be displayed through other operations.

For example, the image display device may include a bottom for displaying one selected image, and the selected image may be displayed upon detecting the pressing of that button.

Alternatively, the processing to display only one selected image on the touchscreen need not be performed; instead, the screen may be configured to allow an image selection at any time.

For example, in Embodiment 2, since there is a screen for displaying only one selected image separately from the side touchscreen, it is permissible that the side touchscreen does not perform such display of one selected image only.

(20) In Embodiment 2, the group selection touchscreen 1301 is provided for selecting a group, separately from the side touchscreen 102. However, the present invention is not limited to such a structure, as long as a group can be selected upon an operation.

By way of example, a group may be selected via a push button instead of the touchscreen. Alternatively, a user interface for selecting a group may be provided on the side touchscreen 102.

(21) A material other than the whole stack and the partial stack may also be displayed on the touchscreen 102.

For instance, if the selected order is displayed over the selected image, then the user can acknowledge the order of the image that he/she is looking at from the numerical value of the displayed selected order.

Also, in order to show the magnitude of a pressure level, it is permissible to display a circle having a size corresponding to the magnitude of a pressure level, with the center of the circle being the operation location. This way, the user can acknowledge the magnitude of a pressure level at which he/she is performing the touch.

(22) In Embodiment 2, the front display 1302 may be omitted from the image display device.

In this case, the processing to display images on the front display 1302 and the processing to clear an image are not performed in the processing of FIG. 18 (steps S901a and S904a).

(23) The image display device 100 pertaining to Embodiment 1 may be additionally provided with a display for displaying an entirety of one selected image, similarly to the one provided in the image display device 100a pertaining to Embodiment 2.

In this case, processing to display an entirety of one selected image on the additionally provided display is added to the selected state display processing (FIG. 11).

(24) The above modification examples may be implemented in combination.

4. Summary

The following describes the structure and effects of a content display device pertaining to the present invention.

(1) A content display device comprises: a detection unit operable to detect an operation location and an operation amount of an operation that has been made on an operation member; a display unit; a display control unit operable to (i) based on the operation location, select one content from among a plurality of contents that have been arranged in sequence, and (ii) cause the display unit to display the selected one content; and a display update unit operable to cause the display unit to display another content when the operation location has moved during the display of the selected one content, an order of said another content being different from an order of the selected one content by a number based on the operation amount detected by the detection unit.

In Embodiments, the operation member and the detection unit are achieved by the touch sensor and the pressure-sensitive sensor of the touchscreen 102; the display unit is achieved by the liquid crystal display of the touchscreen 102; the display control unit is achieved by a combination of the display control unit 202 and the selected order calculation unit 205; and the display update unit is achieved by a combination of the display control unit 202 and the selected order update unit 208.

The content display device having the above structure can designate a rough order by designating a location within an entirety of the plurality of contents. The order of content to be displayed can be changed by moving the operation location from the designated order to the order of desired content.

At this time, the amount by which the order of content to be displayed is changed at once can be adjusted by the amount of operation performed. Hence, in a case where the designated order is distant from the order of the desired content, the amount of operation can be adjusted to make a large change in the order of content to be displayed. This way, the designated order can be quickly changed to the vicinity of the order of the desired content. In a case where the designated order is in the vicinity of the order of the desired content, the amount of operation can be adjusted to make a small change in the order of content to be displayed. This way, the desired content can be selected and displayed quickly.

Therefore, even when there are a large number of contents, the desired content can be selected and displayed quickly.

(2) The content display device may further comprise a touchscreen including the operation member and the display unit, one of which being overlaid on the other.

The above structure allows for a direct operation on the display unit via the touchscreen.

(3) The content display device may be configured such that the display control unit is further operable to (i) arrange first display objects that correspond one-to-one to the plurality of contents in accordance with the sequence of the plurality of contents, and (ii) cause the touchscreen to display the arranged first display objects, and the selected one content corresponds to one of the first display objects that has been displayed on the touchscreen at the operation location detected by the detection unit.

The above structure makes it easy to grasp where in the entire contents the content selected by the user is located.

(4) The content display device may be configured such that the display control unit causes the touchscreen to display the first display objects in such a manner that part of the first display objects is distinguishable from a rest of the first display objects, the part containing said one of the first display objects corresponding to the selected one content, a total number of first display objects included in the part corresponding to the operation amount detected by the detection unit.

The above structure makes it easy to grasp the extent of the operation amount.

(5) The content display device may be configured such that the touchscreen is a pressure-sensitive touchscreen, and the detection of the operation amount by the detection unit denotes detection of a pressure level of pressure applied by pressing the touchscreen.

With the above structure, the amount by which the order of content to be displayed is changed at once can be adjusted by the pressure level of pressure applied by pressing the pressure-sensitive touchscreen with use of an indicator such as a finger and a stylus.

(6) The content display device may be configured such that the display control unit sets the number corresponding to the operation amount detected by the detection unit in such a manner that the number becomes smaller as the pressure level becomes larger, and when causing the display unit to display said another content whose order is different from the order of the selected one content by a number based on the operation amount detected by the detection unit, the display update unit makes said number the same as the number set by the display control unit.

With the above structure, the greater the magnitude of pressure on the touchscreen is, the finer operation can be performed. As a result, it becomes easy to grasp to what extent the order of content to be displayed changes via a single operation.

(7) The content display device may be configured such that the touchscreen is an electrostatic capacitive touchscreen, and the detection of the operation amount by the detection unit denotes detection of an area of a portion of the touchscreen that is touched by an object.

With the above structure, the amount by which the order of content to be displayed is changed at once can be adjusted by the extent of the area of a touched portion of the electrostatic capacitive touchscreen.

(8) The content display device may be configured such that the display control unit causes the touchscreen to display at least a part of the selected one content at the operation location.

The above structure makes it possible to check the selected content on the touchscreen.

(9) The content display device may be configured such that: each of the plurality of contents belongs to one of a plurality of groups; the content display device further comprises (i) a group selection unit operable to select one of the plurality of groups upon receiving an operation, and (ii) an extraction unit operable to extract, from among the plurality of contents, two or more contents belonging to the group selected by the group selection unit; and the plurality of contents that have been arranged in sequence are the two or more contents that have been extracted.

The above structure can narrow down the contents to be displayed based on the group to which desired content belongs. Consequently, the desired content can be selected and displayed more quickly.

(10) The content display device may further comprise: a group display unit operable to display a plurality of second display objects that respectively represent the plurality of groups in such a manner that one of the second display objects representing the group selected by the group selection unit is distinguishable from a rest of the second display objects; and a group selection touchscreen including the group display unit and the group selection unit, one of which being overlaid on the other.

With the above structure, the group can be selected by a touch operation with use of the touchscreen.

(11) The content display device may be configured such that a housing thereof includes both of (i) the touchscreen including the operation member and the display unit, one of which being overlaid on the other, and (ii) the group selection touchscreen.

With the above structure, the operation can be performed at two locations on the same housing. Accordingly, the desired content can be selected and displayed more quickly.

(12) The content display device may further comprise a content display unit operable to display an entirety of the selected one content.

With the above structure, the entire image of the selected content can be checked on a screen that is different from a screen for selecting the content.

(13) The content display device may be configured such that a housing thereof includes both of (i) a touchscreen including the operation member and the display unit, one of which being overlaid on the other, and (ii) the content display unit.

The above structure allows searching for the desired content while checking the entire image of the selected content on the same housing.

INDUSTRIAL APPLICABILITY

A content display device pertaining to the present invention is applicable to a digital camera, a digital photo frame, an electronic book reader, and the like.

REFERENCE SIGNS LIST 100, 100a image display device
101 power button
102 touchscreen (side touchscreen)
201 image storage unit
202 display control unit (image display control unit)
203 selected order storage unit
204 operation location detection unit (first operation location detection unit)
205 selected order calculation unit
206 pressure detection unit
207 selection range identification unit
208 selected order update unit
1301 group selection touchscreen
1302 front display
1501 second operation location detection unit
1502 group selection unit
1503 group display control unit
1504 group image extraction unit

The invention claimed is:

1. A content display device comprising:
a display hardware unit;
a detection hardware unit operable to detect an operation location and an operation amount of a touch input operation;
a touchscreen including the detection hardware unit and the display hardware unit, one of which being overlaid on the other;
a group selection hardware unit operable to select one of a plurality of groups, each having a plurality of contents belonging thereto;
a memory; and
one or more processors,
wherein the content display device, through execution, by the one or more processors, of a program stored in the memory implements:
an extraction unit operable to extract two or more contents from among the plurality of contents belonging to the group selected by the group selection hardware unit;
a display control unit operable to (i) based on the operation location detected by the detection hardware unit, calculate for one content from among the two or more contents, which have been extracted by the extraction unit and arranged in sequence, a selected order which indicates an order of the one content, and (ii) cause the display hardware unit to display the one content of the selected order which has been calculated; and
a display update unit operable to, each time the operation location detected by the detection hardware unit has moved during a period from calculation of the selected order until the detection hardware unit no longer detects the touch input operation, (i) change the selected order by a number corresponding to the operation amount detected by the detection hardware unit, and (ii) cause the display hardware unit to display a content of the selected order which has been changed;
wherein
the display control unit is further operable to (i) arrange first display objects that correspond one-to-one to the two or more contents in accordance with the sequence of the two or more contents, and (ii) cause the touchscreen to display the arranged first display objects;
the one content for which the display control unit calculates the selected order corresponds to one of the first display objects that has been displayed on the touchscreen at the operation location detected by the detection hardware unit;
the display control unit causes the touchscreen to display the first display objects in such a manner that part of the first display objects is distinguishable from a rest of the first display objects, the part containing said one of the first display objects corresponding to the one content of the selected order which has been calculated, a total number of first display objects included in the part corresponding to the operation amount detected by the detection hardware unit;
the touchscreen is a pressure-sensitive touchscreen;
the detection of the operation amount by the detection hardware unit denotes detection of a pressure level of pressure applied by pressing the touchscreen;
the display control unit sets the number corresponding to the operation amount detected by the detection hardware unit in such a manner that the number becomes smaller as the pressure level becomes larger, and
the display update unit, each time the operation location has moved during the period from calculation of the selected order until the detection hardware unit no longer detects the operation amount, changes the selected order by the number corresponding to the operation amount detected by the detection hardware unit, the number being set by the display control unit.

2. The content display device of claim 1, wherein
the touchscreen is an electrostatic capacitive touchscreen, and
the detection of the operation amount by the detection hardware unit denotes detection of an area of a portion of the touchscreen that is touched by an object.

3. The content display device of claim 1, wherein
the display control unit causes the touchscreen to display at least a part of the one content of the selected order which has been calculated at the operation location.

4. The content display device of claim 1, further comprising:
a group display hardware unit operable to display a plurality of second display objects that respectively represent the plurality of groups in such a manner that one of the second display objects representing the group selected by the group selection hardware unit is distinguishable from a rest of the second display objects; and
a group selection touchscreen including the group display hardware unit and the group selection hardware unit, one of which being overlaid on the other.

5. The content display device of claim 4, wherein
a housing thereof includes both of (i) the touchscreen including the detection hardware unit and the display unit, one of which being overlaid on the other, and (ii) the group selection touchscreen.

6. The content display device of claim 1, further comprising
a content display hardware unit operable to display an entirety of the one content of the selected order.

7. The content display device of claim 6, wherein
a housing thereof includes both of (i) a touchscreen including the detection hardware unit and the display hardware unit, one of which being overlaid on the other, and (ii) the content display hardware unit.

8. A content display method used in a content display device, the content display device comprising: a display hardware unit; a detection hardware unit operable to detect an operation location and an operation amount of a touch input operation; a touchscreen including the detection hardware unit and the display hardware unit, one of which being overlaid on the other, and a group selection hardware unit operable to select one of a plurality of groups, each having a plurality of contents belonging thereto,
the content display method comprising the steps of:
(a) extracting two or more contents from among the plurality of contents belonging to the group selected by the group selection hardware unit;
(b) based on the operation location detected by the detection hardware unit, calculating for one content from among the two or more contents, which have been extracted in the step (a) and arranged in sequence, a selected order which indicates an order of the one content, and causing the display hardware unit to display the one content of the selected order which has been calculated;
(c) each time the operation location detected by the detection hardware unit has moved during a period from calculation of the selected order until the detection hardware unit no longer detects the touch input operation, (i) changing the selected order by a number corresponding to the operation amount detected by the detection hardware unit, and (ii) causing the display hardware unit to display a content of the selected order which has been changed;

wherein the display control unit is further operable to (i) arrange first display objects that correspond one-to-one to the two or more contents in accordance with the sequence of the two or more contents, and (ii) cause the touchscreen to display the arranged first display objects;

the one content for which the display control unit calculates the selected order corresponds to one of the first display objects that has been displayed on the touchscreen at the operation location detected by the detection hardware unit;

the display control unit causes the touchscreen to display the first display objects in such a manner that part of the first display objects is distinguishable from a rest of the first display objects, the part containing said one of the first display objects corresponding to the one content of the selected order which has been calculated, a total number of first display objects included in the part corresponding to the operation amount detected by the detection hardware unit;

the touchscreen is a pressure-sensitive touchscreen;

the detection of the operation amount by the detection hardware unit denotes detection of a pressure level of pressure applied by pressing the touchscreen;

the display control unit sets the number corresponding to the operation amount detected by the detection hardware unit in such a manner that the number becomes smaller as the pressure level becomes larger, and the display update unit, each time the operation location has moved during the period from calculation of the selected order until the detection hardware unit no longer detects the operation amount, changes the selected order by the number corresponding to the operation amount detected by the detection hardware unit, the number being set by the display control unit.

9. A non-transitory computer-readable recording medium having recorded thereon a content display program executable by a computer, the computer comprising a display hardware unit; a detection hardware unit operable to detect an operation location and an operation amount of a touch input operation; a touchscreen including the detection hardware unit and the display hardware unit, one of which being overlaid on the other; and a group selection hardware unit operable to select one of a plurality of groups, each having a plurality of contents belonging thereto;

the content display program comprising the steps of:

(a) extracting two or more contents from among the plurality of contents belonging to the group selected by the group selection hardware unit;

(b) based on the operation location detected by the detection hardware unit, calculating one content from among the two or more contents, which have been extracted in the step (a) and arranged in sequence, a selected order which indicates an order of the one content, and causing the display hardware unit to display the one content of the selected order which has been calculated; and (c) each time the operation location detected by the detection hardware unit has moved during a period from calculation of the selected order until the detection hardware unit no longer detects the touch input operation, (i) changing the selected order by a number corresponding to the operation amount detected by the detection hardware unit, and (ii) causing the display hardware unit to display a content of the selected order which has been changed;

wherein the display control unit is further operable to (i) arrange first display objects that correspond one-to-one to the two or more contents in accordance with the sequence of the two or more contents, and (ii) cause the touchscreen to display the arranged first display objects;

the one content for which the display control unit calculates the selected order corresponds to one of the first display objects that has been displayed on the touchscreen at the operation location detected by the detection hardware unit;

the display control unit causes the touchscreen to display the first display objects in such a manner that part of the first display objects is distinguishable from a rest of the first display objects, the part containing said one of the first display objects corresponding to the one content of the selected order which has been calculated, a total number of first display objects included in the part corresponding to the operation amount detected by the detection hardware unit;

the touchscreen is a pressure-sensitive touchscreen;

the detection of the operation amount by the detection hardware unit denotes detection of a pressure level of pressure applied by pressing the touchscreen;

the display control unit sets the number corresponding to the operation amount detected by the detection hardware unit in such a manner that the number becomes smaller as the pressure level becomes larger, and the display update unit, each time the operation location has moved during the period from calculation of the selected order until the detection hardware unit no longer detects the operation amount, changes the selected order by the number corresponding to the operation amount detected by the detection hardware unit, the number being set by the display control unit.

10. An integrated circuit comprising:

a display hardware unit;

a detection hardware unit operable to detect an operation location and an operation amount of a touch input operation;

a touchscreen including the detection hardware unit and the display hardware unit, one of which being overlaid on the other;

a group selection hardware unit operable to select one of a plurality of groups, each having a plurality of contents belonging thereto;

an extraction hardware unit operable to extract two or more contents from among the plurality of contents belonging to the group selected by the group selection hardware unit;

a display control hardware unit operable to (i) based on the operation location detected by the detection hardware unit, calculate for one content from among the two or more contents, which have been extracted by the extraction unit and arranged in sequence, a selected order which indicates an order of the one content, and (ii) cause the display hardware unit to display the one content of the selected order which has been calculated; and a display update unit operable to each time the operation location detected by the detection hardware unit has moved during a period from calculation of the selected order until the detection hardware unit no longer detects the touch input operation, (i) change the selected order by a number corresponding to the operation amount detected by the detection hardware unit, and (ii) cause the display hardware unit to display a content of the selected order which has been changed;

wherein the display control unit is further operable to (i) arrange first display objects that correspond one-to-one to the two or more contents in accordance with the sequence of the two or more contents, and (ii) cause the touchscreen to display the arranged first display objects;

the one content for which the display control unit calculates the selected order corresponds to one of the first display objects that has been displayed on the touchscreen at the operation location detected by the detection hardware unit;

the display control unit causes the touchscreen to display the first display objects in such a manner that part of the first display objects is distinguishable from a rest of the first display objects, the part containing said one of the first display objects corresponding to the one content of the selected order which has been calculated, a total number of first display objects included in the part corresponding to the operation amount detected by the detection hardware unit;

the touchscreen is a pressure-sensitive touchscreen;

the detection of the operation amount by the detection hardware unit denotes detection of a pressure level of pressure applied by pressing the touchscreen;

the display control unit sets the number corresponding to the operation amount detected by the detection hardware unit in such a manner that the number becomes smaller as the pressure level becomes larger, and the display update unit, each time the operation location has moved during the period from calculation of the selected order until the detection hardware unit no longer detects the operation amount, changes the selected order by the number corresponding to the operation amount detected by the detection hardware unit, the number being set by the display control unit.

* * * * *